(12) United States Patent
Splaine et al.

(10) Patent No.: US 11,785,293 B2
(45) Date of Patent: *Oct. 10, 2023

(54) METHODS AND APPARATUS TO COLLECT DISTRIBUTED USER INFORMATION FOR MEDIA IMPRESSIONS

(71) Applicant: The Nielsen Company (US), LLC, New York, NY (US)

(72) Inventors: Steven J. Splaine, Tampa, FL (US); Adrian Swift, Brooklyn, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,683

(22) Filed: Mar. 7, 2022

(65) Prior Publication Data
US 2022/0191589 A1 Jun. 16, 2022

Related U.S. Application Data

(63) Continuation of application No. 17/087,109, filed on Nov. 2, 2020, now Pat. No. 11,272,249, which is a
(Continued)

(51) Int. Cl.
*H04N 21/442* (2011.01)
*H04N 21/84* (2011.01)
(Continued)

(52) U.S. Cl.
CPC ... *H04N 21/44213* (2013.01); *G06Q 30/0201* (2013.01); *H04L 67/53* (2022.05);
(Continued)

(58) Field of Classification Search
CPC .. H04N 21/84; H04N 21/812; H04N 21/6582; H04N 21/6175; H04N 21/6125;
(Continued)

(56) References Cited

U.S. PATENT DOCUMENTS 3,540,003 A 11/1970 Murphy
3,818,458 A 6/1974 Deese
(Continued)

FOREIGN PATENT DOCUMENTS

AU 2013205736 5/2013
AU 2015230772 10/2015
(Continued)

OTHER PUBLICATIONS

Coffey, "Internet Audience Measurement: A Practitioner's View," Journal of Interactive Advertising, vol. 1, No. 2, Spring 2001, pp. 10-17.
(Continued)

*Primary Examiner* — Michael B. Pierorazio

(57) ABSTRACT

A disclosed example apparatus includes at least one memory, instructions in the apparatus, and processor circuitry to execute the instructions to store a logged media impression for a media identifier representative of media accessed via the Internet, cause transmission of a device identifier or a user identifier to a database proprietor when a user has not elected to not participate in third-party tracking corresponding to online activities, access user information from the database proprietor based on the device identifier or the user identifier, log a demographic impression based on the media impression and the user information, and generate an impression report corresponding to the media based on the demographic impression.

20 Claims, 5 Drawing Sheets

Related U.S. Application Data continuation of application No. 16/235,902, filed on Dec. 28, 2018, now Pat. No. 10,827,217, which is a continuation of application No. 15/251,954, filed on Aug. 30, 2016, now Pat. No. 10,205,994.

(60) Provisional application No. 62/268,871, filed on Dec. 17, 2015.

(51) Int. Cl.

| | | |
|---|---|---|
| *H04N 21/61* | (2011.01) | |
| *G06Q 30/0201* | (2023.01) | |
| *H04N 21/258* | (2011.01) | |
| *H04N 21/426* | (2011.01) | |
| *H04N 21/4782* | (2011.01) | |
| *H04N 21/658* | (2011.01) | |
| *H04L 67/53* | (2022.01) | |
| *H04L 67/50* | (2022.01) | |
| *H04N 21/4788* | (2011.01) | |
| *H04L 67/02* | (2022.01) | |
| *H04N 21/81* | (2011.01) | |
| *H04L 67/306* | (2022.01) | |

(52) U.S. Cl.
CPC ..... *H04L 67/535* (2022.05); *H04N 21/25866* (2013.01); *H04N 21/42684* (2013.01); *H04N 21/44222* (2013.01); *H04N 21/44226* (2020.08); *H04N 21/4782* (2013.01); *H04N 21/6125* (2013.01); *H04N 21/6175* (2013.01); *H04N 21/6582* (2013.01); *H04N 21/84* (2013.01); *H04L 67/02* (2013.01); *H04L 67/306* (2013.01); *H04N 21/4788* (2013.01); *H04N 21/812* (2013.01)

(58) Field of Classification Search
CPC ........... H04N 21/4788; H04N 21/4782; H04N 21/4426; H04N 21/44222; H04N 21/44213; H04N 21/42684; H04N 21/25866; H04L 67/53; H04L 67/535; H04L 67/306; H04L 67/02; G06Q 30/0201

See application file for complete search history.

(56) References Cited

U.S. PATENT DOCUMENTS

| | | |
|---|---|---|
| 3,906,450 A | 9/1975 | Prado, Jr. |
| 3,906,454 A | 9/1975 | Martin |
| T955,010 I4 | 2/1977 | Ragonese et al. |
| 4,168,396 A | 9/1979 | Best |
| 4,230,990 A | 10/1980 | Lert, Jr. et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Löfberg |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Wiedemer |
| 4,703,324 A | 10/1987 | White |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,113,518 A | 5/1992 | Durst, Jr. et al. |
| 5,182,770 A | 1/1993 | Medveczky et al. |
| 5,204,897 A | 4/1993 | Wyman |
| 5,214,780 A | 5/1993 | Ingoglia et al. |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Grube et al. |
| 5,497,479 A | 3/1996 | Hornbuckle |
| 5,499,340 A | 3/1996 | Barritz |
| 5,511,000 A * | 4/1996 | Kaloi ............ G11C 7/16 704/278 |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,078,349 A * | 6/2000 | Molloy ............... H04N 21/658 375/E7.182 |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,164,975 A | 12/2000 | Weingarden et al. |
| 6,195,640 B1 * | 2/2001 | Mullaly ............... G06F 3/013 704/260 |
| 6,223,215 B1 | 4/2001 | Hunt et al. |
| 6,247,050 B1 | 6/2001 | Tso et al. |
| 6,279,036 B1 | 8/2001 | Himmel et al. |
| 6,286,140 B1 | 9/2001 | Ivanyi |
| 6,307,526 B1 * | 10/2001 | Mann ............... H04N 23/55 348/207.1 |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,959,450 B1 * | 10/2005 | Ritter ............. H04N 21/234363 382/103 |
| 6,993,590 B1 | 1/2006 | Gauthier et al. |
| 7,039,699 B1 | 5/2006 | Narin et al. |
| 7,092,926 B2 | 8/2006 | Cerrato |

(56) References Cited

U.S. PATENT DOCUMENTS

| | | | |
|---|---|---|---|
| 7,127,305 B1 | 10/2006 | Palmon | |
| 7,139,723 B2 | 11/2006 | Conkwright et al. | |
| 7,146,329 B2 | 12/2006 | Conkwright et al. | |
| 7,150,030 B1 | 12/2006 | Eldering et al. | |
| 7,152,074 B2 | 12/2006 | Dettinger et al. | |
| 7,159,023 B2 | 1/2007 | Tufts | |
| 7,181,412 B1 | 2/2007 | Fulgoni et al. | |
| 7,257,546 B2 | 8/2007 | Ebrahimi et al. | |
| 7,260,837 B2 | 8/2007 | Abraham et al. | |
| 7,272,617 B1 | 9/2007 | Bayer et al. | |
| 7,302,447 B2 | 11/2007 | Dettinger et al. | |
| 7,323,991 B1 | 1/2008 | Eckert et al. | |
| 7,343,417 B2 | 3/2008 | Baum | |
| 7,363,643 B2 | 4/2008 | Drake et al. | |
| 7,386,473 B2 | 6/2008 | Blumenau | |
| 7,406,516 B2 | 7/2008 | Davis et al. | |
| 7,444,388 B1 | 10/2008 | Svendsen | |
| 7,526,538 B2 | 4/2009 | Wilson | |
| 7,546,370 B1 | 6/2009 | Acharya et al. | |
| 7,590,568 B2 | 9/2009 | Blumenau | |
| 7,593,576 B2 | 9/2009 | Meyer et al. | |
| 7,600,014 B2 | 10/2009 | Russell et al. | |
| 7,613,635 B2 | 11/2009 | Blumenau | |
| 7,634,786 B2 | 12/2009 | Knee et al. | |
| 7,644,156 B2 | 1/2010 | Blumenau | |
| 7,647,418 B2 | 1/2010 | Ash et al. | |
| 7,650,407 B2 | 1/2010 | Blumenau | |
| 7,653,724 B2 | 1/2010 | Blumenau | |
| 7,716,326 B2 | 5/2010 | Blumenau | |
| 7,720,963 B2 | 5/2010 | Blumenau | |
| 7,720,964 B2 | 5/2010 | Blumenau | |
| 7,736,000 B2 * | 6/2010 | Enriquez | A61B 3/113 351/205 |
| 7,756,974 B2 | 7/2010 | Blumenau | |
| 7,788,216 B2 | 8/2010 | Li et al. | |
| 7,882,054 B2 | 2/2011 | Levitan | |
| 7,882,242 B2 | 2/2011 | Chen | |
| 7,890,451 B2 | 2/2011 | Cancel et al. | |
| 7,925,694 B2 | 4/2011 | Harris | |
| 7,941,525 B1 | 5/2011 | Yavilevich | |
| 7,949,565 B1 | 5/2011 | Eldering et al. | |
| 7,949,639 B2 | 5/2011 | Hunt et al. | |
| 7,958,234 B2 | 6/2011 | Thomas et al. | |
| 7,962,603 B1 | 6/2011 | Morimoto | |
| 8,006,259 B2 | 8/2011 | Drake et al. | |
| 8,032,626 B1 | 10/2011 | Russell et al. | |
| 8,046,255 B2 | 10/2011 | Bistriceanu et al. | |
| 8,060,601 B1 | 11/2011 | Brown et al. | |
| 8,087,041 B2 | 12/2011 | Fu et al. | |
| 8,117,193 B2 | 2/2012 | Svendsen et al. | |
| 8,131,763 B2 | 3/2012 | Tuscano et al. | |
| 8,131,861 B2 | 3/2012 | Butler et al. | |
| 8,151,194 B1 | 4/2012 | Chan et al. | |
| 8,151,291 B2 | 4/2012 | Ramaswamy | |
| 8,180,112 B2 | 5/2012 | Kurtz et al. | |
| 8,196,064 B2 * | 6/2012 | Krzyzanowski | H04N 21/41265 715/814 |
| 8,229,458 B2 | 7/2012 | Busch | |
| 8,229,780 B2 | 7/2012 | Davidow et al. | |
| 8,234,408 B2 | 7/2012 | Jungck | |
| 8,235,814 B2 | 8/2012 | Willis et al. | |
| 8,266,687 B2 | 9/2012 | Baldry | |
| 8,271,886 B2 | 9/2012 | Lee et al. | |
| 8,280,683 B2 | 10/2012 | Finkler | |
| 8,302,120 B2 | 10/2012 | Ramaswamy | |
| 8,307,006 B2 | 11/2012 | Hannan et al. | |
| 8,307,458 B2 | 11/2012 | Kasahara et al. | |
| 8,370,489 B2 | 2/2013 | Mazumdar et al. | |
| 8,387,084 B1 | 2/2013 | Klappert et al. | |
| 8,412,648 B2 | 4/2013 | Karypis et al. | |
| 8,453,173 B1 | 5/2013 | Anderson et al. | |
| 8,468,271 B1 | 6/2013 | Panwar et al. | |
| 8,484,511 B2 | 7/2013 | Tidwell et al. | |
| 8,495,198 B2 | 7/2013 | Sim et al. | |
| 8,504,411 B1 | 8/2013 | Subasic et al. | |
| 8,504,507 B1 | 8/2013 | Srinivasaiah | |
| 8,514,907 B2 | 8/2013 | Wright et al. | |
| 8,543,454 B2 | 9/2013 | Fleischman et al. | |
| 8,549,357 B2 * | 10/2013 | Wilson | G06F 11/008 714/25 |
| 8,549,552 B2 | 10/2013 | Ramaswamy et al. | |
| 8,600,796 B1 | 12/2013 | Sterne et al. | |
| 8,626,084 B2 | 1/2014 | Chan et al. | |
| 8,631,122 B2 | 1/2014 | Kadam et al. | |
| 8,688,524 B1 | 4/2014 | Ramalingam et al. | |
| 8,700,457 B2 | 4/2014 | Craft | |
| 8,713,168 B2 | 4/2014 | Heffernan et al. | |
| 8,751,461 B2 | 6/2014 | Abraham et al. | |
| 8,775,332 B1 | 7/2014 | Morris et al. | |
| 8,831,362 B1 | 9/2014 | Steffens | |
| 8,843,626 B2 | 9/2014 | Mazumdar et al. | |
| 8,898,689 B2 | 11/2014 | Georgakis | |
| 8,909,771 B2 | 12/2014 | Heath | |
| 8,910,195 B1 | 12/2014 | Barney et al. | |
| 8,930,701 B2 | 1/2015 | Burbank et al. | |
| 8,954,536 B2 | 2/2015 | Kalus et al. | |
| 8,973,023 B1 | 3/2015 | Rao et al. | |
| 8,984,547 B2 | 3/2015 | Lambert et al. | |
| 9,055,122 B2 | 6/2015 | Grecco et al. | |
| 9,083,853 B2 | 7/2015 | Shkedi | |
| 9,106,709 B2 | 8/2015 | Desilva et al. | |
| 9,117,217 B2 | 8/2015 | Wilson et al. | |
| 9,147,202 B1 * | 9/2015 | Muse | G06Q 30/0205 |
| 9,202,221 B2 * | 12/2015 | Wise | G06Q 30/02 |
| 9,210,130 B2 | 12/2015 | Burbank et al. | |
| 9,215,288 B2 | 12/2015 | Seth et al. | |
| 9,218,612 B2 | 12/2015 | Mazumdar et al. | |
| 9,237,138 B2 | 1/2016 | Bosworth et al. | |
| 9,301,007 B2 | 3/2016 | Ramaswamy | |
| 10,122,807 B2 * | 11/2018 | Yang | H04L 67/535 |
| 10,205,994 B2 * | 2/2019 | Splaine | H04L 67/53 |
| 10,360,571 B2 * | 7/2019 | Garel | G06Q 30/0269 |
| 10,827,217 B2 | 11/2020 | Splaine et al. | |
| 11,272,249 B2 | 3/2022 | Splaine et al. | |
| 2002/0023159 A1 | 2/2002 | Vange et al. | |
| 2002/0085843 A1 * | 7/2002 | Mann | E03C 1/057 396/374 |
| 2002/0099609 A1 | 7/2002 | Nascenzi et al. | |
| 2002/0141614 A1 * | 10/2002 | Lin | H04N 19/17 375/E7.182 |
| 2003/0006911 A1 | 1/2003 | Smith et al. | |
| 2003/0037131 A1 | 2/2003 | Verma | |
| 2003/0046385 A1 | 3/2003 | Vincent | |
| 2003/0065770 A1 | 4/2003 | Davis et al. | |
| 2003/0105604 A1 | 6/2003 | Ash et al. | |
| 2003/0177488 A1 | 9/2003 | Smith et al. | |
| 2003/0220901 A1 | 11/2003 | Carr et al. | |
| 2004/0044768 A1 | 3/2004 | Takahashi | |
| 2004/0088212 A1 | 5/2004 | Hill | |
| 2004/0098229 A1 | 5/2004 | Error et al. | |
| 2004/0107125 A1 | 6/2004 | Guheen et al. | |
| 2004/0167763 A1 | 8/2004 | Liebman | |
| 2004/0167928 A1 | 8/2004 | Anderson et al. | |
| 2004/0186840 A1 | 9/2004 | Dettinger et al. | |
| 2005/0033657 A1 | 2/2005 | Herrington et al. | |
| 2005/0108092 A1 * | 5/2005 | Campbell | A61B 3/113 705/14.69 |
| 2005/0166233 A1 | 7/2005 | Beyda et al. | |
| 2005/0223093 A1 | 10/2005 | Hanson et al. | |
| 2005/0262573 A1 | 11/2005 | Bo et al. | |
| 2005/0267799 A1 | 12/2005 | Chan et al. | |
| 2006/0074953 A1 | 4/2006 | Dettinger et al. | |
| 2006/0089754 A1 | 4/2006 | Mortenson | |
| 2006/0178996 A1 | 8/2006 | Matsushima et al. | |
| 2006/0184617 A1 | 8/2006 | Nicholas et al. | |
| 2006/0190616 A1 | 8/2006 | Mayerhofer et al. | |
| 2006/0256133 A1 * | 11/2006 | Rosenberg | G06F 3/013 345/619 |
| 2006/0271641 A1 | 11/2006 | Stavrakos et al. | |
| 2006/0294259 A1 | 12/2006 | Matefi et al. | |
| 2007/0043769 A1 | 2/2007 | Kasahara et al. | |
| 2007/0050253 A1 * | 3/2007 | Biggs | G06Q 30/0271 705/14.67 |

(56) References Cited

U.S. PATENT DOCUMENTS

| | | |
|---|---|---|
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0165964 A1* | 7/2007 | Wolf ................. G06F 3/048 382/276 |
| 2007/0198327 A1 | 8/2007 | Yazdani et al. |
| 2007/0208711 A1 | 9/2007 | Rhoads et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2007/0300309 A1 | 12/2007 | Naito |
| 2008/0004958 A1 | 1/2008 | Ralph et al. |
| 2008/0022569 A1* | 1/2008 | Winn ................. G09F 25/00 40/457 |
| 2008/0086356 A1 | 4/2008 | Glassman et al. |
| 2008/0091639 A1 | 4/2008 | Davis et al. |
| 2008/0103978 A1* | 5/2008 | Houston ............. H04N 7/173 705/51 |
| 2008/0111833 A1* | 5/2008 | Thorn ................ G06F 1/3231 345/690 |
| 2008/0126420 A1 | 5/2008 | Wright et al. |
| 2008/0147488 A1* | 6/2008 | Tunick ............... G06V 40/20 382/209 |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0125934 A1 | 5/2009 | Jones et al. |
| 2009/0171762 A1 | 7/2009 | Alkove et al. |
| 2009/0217315 A1 | 8/2009 | Malik et al. |
| 2009/0254633 A1 | 10/2009 | Olive |
| 2009/0292587 A1 | 11/2009 | Fitzgerald |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0053555 A1* | 3/2010 | Enriquez ............ G06V 40/19 351/210 |
| 2010/0070621 A1 | 3/2010 | Urdan et al. |
| 2010/0076814 A1 | 3/2010 | Manning |
| 2010/0080418 A1* | 4/2010 | Ito .................... G06V 40/20 382/103 |
| 2010/0088152 A1 | 4/2010 | Bennett |
| 2010/0088373 A1 | 4/2010 | Pinkham |
| 2010/0114739 A1 | 5/2010 | Johnston |
| 2010/0121676 A1 | 5/2010 | Jackson |
| 2010/0153175 A1 | 6/2010 | Pearson et al. |
| 2010/0153207 A1 | 6/2010 | Roberts et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0041062 A1 | 2/2011 | Singer et al. |
| 2011/0087519 A1 | 4/2011 | Fordyce, III et al. |
| 2011/0087919 A1 | 4/2011 | Deshmukh et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0161163 A1* | 6/2011 | Carlson .............. G06F 3/015 348/78 |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | Von Sydow et al. |
| 2011/0202500 A1 | 8/2011 | Warn et al. |
| 2011/0208860 A1 | 8/2011 | Sim et al. |
| 2011/0213664 A1* | 9/2011 | Osterhout ........... G06F 3/013 705/14.58 |
| 2011/0231240 A1 | 9/2011 | Schoen et al. |
| 2011/0238520 A1 | 9/2011 | Selley |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0255010 A1* | 10/2011 | Sakai ................. H04N 21/426 348/730 |
| 2011/0282730 A1 | 11/2011 | Tarmas |
| 2011/0282997 A1 | 11/2011 | Prince et al. |
| 2011/0288907 A1 | 11/2011 | Harvey et al. |
| 2011/0292181 A1* | 12/2011 | Acharya .............. G06F 21/32 348/47 |
| 2012/0005015 A1 | 1/2012 | Park et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0075168 A1* | 3/2012 | Osterhout ........... G06F 3/017 345/8 |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0143713 A1 | 6/2012 | Dittus et al. |
| 2012/0151079 A1 | 6/2012 | Basehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0194418 A1* | 8/2012 | Osterhout ........... G02B 27/0149 345/156 |
| 2012/0194419 A1* | 8/2012 | Osterhout ........... G02B 27/017 345/156 |
| 2012/0194420 A1* | 8/2012 | Osterhout ........... G06F 3/013 345/156 |
| 2012/0194549 A1* | 8/2012 | Osterhout ........... G06Q 30/02 345/633 |
| 2012/0194550 A1* | 8/2012 | Osterhout ........... G06F 1/163 345/633 |
| 2012/0194551 A1* | 8/2012 | Osterhout ........... G06F 3/005 345/633 |
| 2012/0194552 A1* | 8/2012 | Osterhout ........... G06F 1/163 345/633 |
| 2012/0194553 A1* | 8/2012 | Osterhout ........... G06F 3/017 345/633 |
| 2012/0200488 A1* | 8/2012 | Osterhout ........... G02B 27/0093 345/156 |
| 2012/0200499 A1* | 8/2012 | Osterhout ........... G06F 1/163 345/158 |
| 2012/0200601 A1* | 8/2012 | Osterhout ........... G02B 27/017 345/633 |
| 2012/0206322 A1* | 8/2012 | Osterhout ........... G06F 3/005 345/8 |
| 2012/0206323 A1* | 8/2012 | Osterhout ........... G06Q 30/02 345/8 |
| 2012/0206331 A1 | 8/2012 | Gandhi |
| 2012/0206334 A1* | 8/2012 | Osterhout ........... G06F 1/163 345/156 |

(56) References Cited

U.S. PATENT DOCUMENTS

| | | | |
|---|---|---|---|
| 2012/0206335 A1* | 8/2012 | Osterhout | G06F 1/163 345/156 |
| 2012/0206485 A1* | 8/2012 | Osterhout | G06F 1/163 345/633 |
| 2012/0209920 A1 | 8/2012 | Neystadt et al. | |
| 2012/0212414 A1* | 8/2012 | Osterhout | G06F 1/163 345/158 |
| 2012/0212484 A1* | 8/2012 | Haddick | G06Q 30/02 345/419 |
| 2012/0212499 A1* | 8/2012 | Haddick | G02B 27/0093 345/589 |
| 2012/0215621 A1 | 8/2012 | Heffernan et al. | |
| 2012/0221559 A1 | 8/2012 | Kidron | |
| 2012/0239407 A1 | 9/2012 | Lynch et al. | |
| 2012/0239809 A1 | 9/2012 | Mazumdar et al. | |
| 2012/0254466 A1 | 10/2012 | Jungck | |
| 2012/0265606 A1 | 10/2012 | Patnode | |
| 2012/0300061 A1* | 11/2012 | Osman | G06F 1/325 340/436 |
| 2012/0302222 A1 | 11/2012 | Williamson et al. | |
| 2012/0303454 A1 | 11/2012 | Gupta | |
| 2012/0310729 A1 | 12/2012 | Daito et al. | |
| 2012/0311017 A1 | 12/2012 | Sze et al. | |
| 2013/0007794 A1 | 1/2013 | Besehanic et al. | |
| 2013/0013308 A1 | 1/2013 | Cao et al. | |
| 2013/0014144 A1 | 1/2013 | Bhatia et al. | |
| 2013/0014223 A1 | 1/2013 | Bhatia et al. | |
| 2013/0019262 A1 | 1/2013 | Bhatia et al. | |
| 2013/0046615 A1 | 2/2013 | Liyanage | |
| 2013/0060629 A1 | 3/2013 | Rangsikitpho et al. | |
| 2013/0066713 A1 | 3/2013 | Umeda | |
| 2013/0080263 A1 | 3/2013 | Goldman et al. | |
| 2013/0080268 A1 | 3/2013 | Gordon et al. | |
| 2013/0085837 A1* | 4/2013 | Blume | G06Q 30/0241 705/14.41 |
| 2013/0097311 A1 | 4/2013 | Mazumdar et al. | |
| 2013/0097312 A1 | 4/2013 | Mazumdar et al. | |
| 2013/0117103 A1 | 5/2013 | Shimizu et al. | |
| 2013/0124628 A1 | 5/2013 | Weerasinghe | |
| 2013/0138506 A1 | 5/2013 | Zhu et al. | |
| 2013/0138743 A1 | 5/2013 | Amento et al. | |
| 2013/0145022 A1 | 6/2013 | Srivastava et al. | |
| 2013/0159499 A1 | 6/2013 | Besehanic | |
| 2013/0198125 A1 | 8/2013 | Oliver et al. | |
| 2013/0198383 A1 | 8/2013 | Tseng et al. | |
| 2013/0204694 A1 | 8/2013 | Banister et al. | |
| 2013/0212188 A1 | 8/2013 | Duterque et al. | |
| 2013/0212638 A1 | 8/2013 | Wilson | |
| 2013/0246389 A1 | 9/2013 | Osann, Jr. | |
| 2013/0246609 A1 | 9/2013 | Topchy et al. | |
| 2013/0254897 A1 | 9/2013 | Reedy et al. | |
| 2013/0282898 A1 | 10/2013 | Kalus et al. | |
| 2013/0290070 A1 | 10/2013 | Abraham et al. | |
| 2013/0290096 A1 | 10/2013 | Lizotte, III | |
| 2013/0297411 A1 | 11/2013 | Van Datta et al. | |
| 2013/0297467 A1 | 11/2013 | Kidron et al. | |
| 2013/0325588 A1 | 12/2013 | Kalyanam et al. | |
| 2013/0326597 A1 | 12/2013 | Matsushita et al. | |
| 2013/0331971 A1 | 12/2013 | Bida et al. | |
| 2013/0332604 A1 | 12/2013 | Seth et al. | |
| 2014/0033317 A1 | 1/2014 | Barber | |
| 2014/0040171 A1 | 2/2014 | Segalov et al. | |
| 2014/0058836 A1 | 2/2014 | Wiseman et al. | |
| 2014/0075004 A1 | 3/2014 | Van Dusen et al. | |
| 2014/0108130 A1 | 4/2014 | Vos et al. | |
| 2014/0122703 A1 | 5/2014 | Pugh et al. | |
| 2014/0123253 A1 | 5/2014 | David et al. | |
| 2014/0156761 A1 | 6/2014 | Heffernan et al. | |
| 2014/0173746 A1 | 6/2014 | Armstrong-muntner et al. | |
| 2014/0279074 A1 | 9/2014 | Chen et al. | |
| 2014/0280896 A1 | 9/2014 | Papakostas et al. | |
| 2014/0298025 A1 | 10/2014 | Burbank et al. | |
| 2014/0324544 A1 | 10/2014 | Donato et al. | |
| 2014/0324545 A1 | 10/2014 | Splaine et al. | |
| 2014/0337104 A1 | 11/2014 | Splaine et al. | |
| 2015/0019322 A1 | 1/2015 | Alla et al. | |
| 2015/0019327 A1 | 1/2015 | Mazumdar et al. | |
| 2015/0046248 A1 | 2/2015 | Ben-Yaacov et al. | |
| 2015/0046579 A1 | 2/2015 | Perez et al. | |
| 2015/0070585 A1 | 3/2015 | Sharif-ahmadi et al. | |
| 2015/0186403 A1 | 7/2015 | Srivastava et al. | |
| 2015/0189500 A1 | 7/2015 | Bosworth et al. | |
| 2015/0193816 A1 | 7/2015 | Toupet et al. | |
| 2015/0222951 A1 | 8/2015 | Ramaswamy | |
| 2015/0262207 A1 | 9/2015 | Rao et al. | |
| 2016/0063539 A1 | 3/2016 | Alla et al. | |
| 2017/0180797 A1 | 6/2017 | Splaine et al. | |
| 2017/0300947 A1 | 10/2017 | Alla et al. | |
| 2019/0141392 A1 | 5/2019 | Splaine et al. | |
| 2021/0051364 A1 | 2/2021 | Splaine et al. | |

FOREIGN PATENT DOCUMENTS

| | | |
|---|---|---|
| CA | 2872704 | 2/2016 |
| CN | 1898662 | 1/2007 |
| CN | 101222348 | 7/2008 |
| CN | 101505247 | 8/2009 |
| CN | 104520839 | 4/2015 |
| CN | 104541513 | 4/2015 |
| CN | 104584564 | 4/2015 |
| EP | 0325219 | 7/1989 |
| EP | 0703683 | 3/1996 |
| EP | 0744695 | 11/1996 |
| EP | 1059599 | 12/2000 |
| EP | 2991018 | 2/2016 |
| GB | 2176639 | 12/1986 |
| JP | H05324352 | 12/1993 |
| JP | H07262167 | 10/1995 |
| JP | 2001084272 | 3/2001 |
| JP | 2001282982 | 10/2001 |
| JP | 2001357192 | 12/2001 |
| JP | 2002091852 | 3/2002 |
| JP | 2002163562 | 6/2002 |
| JP | 2002373152 | 12/2002 |
| JP | 2003519877 | 6/2003 |
| JP | 2004504674 | 2/2004 |
| JP | 2006127320 | 5/2006 |
| JP | 2006127321 | 5/2006 |
| JP | 2007052633 | 3/2007 |
| JP | 2010039845 | 2/2010 |
| JP | 2010257448 | 11/2010 |
| KR | 20020037980 | 5/2002 |
| KR | 20070051879 | 5/2007 |
| KR | 100765735 | 10/2007 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 00041115 | 7/2000 |
| WO | 0152168 | 7/2001 |
| WO | 0207054 | 1/2002 |
| WO | 03027860 | 4/2003 |
| WO | 2005013072 | 2/2005 |
| WO | 2005024689 | 3/2005 |
| WO | 2008150575 | 12/2008 |
| WO | 2009117733 | 9/2009 |
| WO | 2010088372 | 8/2010 |
| WO | 2010104285 | 9/2010 |
| WO | 2011097624 | 8/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |

(56) References Cited

FOREIGN PATENT DOCUMENTS

| WO | 2013122907 | 8/2013 |
|---|---|---|
| WO | 2013188429 | 12/2013 |
| WO | 2014059319 | 4/2014 |
| WO | 2014172472 | 10/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

Fliptop, "Fliptop Person API Documentation," https://developer.fliptop.com/documentation, retrieved on May 7, 2013, 6 pages.
Fliptop, "Get, Keep and Grow Customers with Fliptop's Customer Intelligence Application," www.fliptop.com/feature#social_matching, retrieved on May 7, 2013, 3 pages.
Fliptop, "What is Fliptop?," www.fliptop.com/about_us, retrieved on May 7, 2013, 1 page.
Rapleaf, "Fast. Simple. Secure," www.rapleaf.com/why-rapleaf/, retrieved on May 7, 2013, 3 pages.
Rapleaf, "Frequently Asked Questions," www.rapleaf.com/about-us/faq/#where, retrieved on May 7, 2013, 3 pages.
Rapleaf, "The Consumer Data Marketplace," www.rapleaf.com/under-the-hood/, retrieved on May 7, 2013, 2 pages.
Rainier, "Why Businesses Should Use Google Plus," The Social Media Guide, thesocialmediaguide.com/social_media/why-businesses-should-use-google-plus, retrieved on May 7, 2013, 9 pages.
Vega, "Nielsen Unveils New Ad Measurement Product," The New York Times, Sep. 27, 2010, 7 pages.
Launder, "Media Journal: Nielsen to Test Online—TV Viewing Tool," The Wall Street Journal, Apr. 30, 2013, 2 pages.
Sharma, "Nielsen Gets Digital to Track Online TV Viewers," Apr. 30, 2013, 3 pages.
Chloe Albanesius, "Facebook Issues Fix for Several Tracking Cookies," Internet article, www.pcmag.com, Sep. 28, 2011, 2 pages.
Emil Protalinski, "Facebook denies cookie tracking allegations," Internet article, www.zdnet.com, Sep. 25, 2011, 2 pages.
Emil Protalinski, "Facebook fixes cookie behavior after logging out," Internet article, www.zdnet.com, Sep. 27, 2011, 2 pages.
Nik Cubrilovic, "Logging out of Facebook is not enough," Internet article, www.nikcub.appspot.com, Sep. 25, 2011, 3 pages.
Emil Protalinksi, "US congressmen ask FTC to investigate Facebook cookies," Internet article, retrieved from http://www.zdnet.com/blog/facebook/us-congressmen-ask-ftc-to-investigate-facebook-cookies/4218, Sep. 28, 2011, 2 pages.
Javascript and Ajax Forum, Sep. 28, 2005, [retrieved from Internet at http://www.webmasterworld.com/forum91/4465.htm on Jun. 29, 2011]. 4 pages.
Vranica, "Nielsen Testing a New Web-Ad Metric," The Wall Street Journal, Sep. 23, 2010 (2 pages).
Wikipedia, "Mental Poker," Jan. 12, 2010, retrieved from Internet at http://en.wikipedia.org/wiki/Mental_poker on Sep. 21, 2010, 5 pages.
The Nielsen Company, "Nielsen Unveils New Online Advertising Measurement," Sep. 27, 2010, [retrieved from Internet at http://nielsen.com/us/en/insights/press-room/2010/nielsen_unveils_newonlineadvertisingmeasurement.html on May 31, 2012], 3 pages.
Adam et al., "Privacy Preserving Integration of Health Care Data," AMIA 2007 Symposium Proceedings, 6 pages.
Arbitron Inc., The Infinite Dial 2011: Navigating Digital Platforms, Edison Research, 2011, 83 pages.
Braverman, Samantha, "Are the Online Marketing Efforts of TV Shows and Programs Worthwhile?" Mar. 30, 2011, 5 pages.
Danaher, Peter J., "A Canonical Expansion Model for Multivariate Media Exposure Distributions: A Generalization of the 'Duplication of Viewing Law,'" Journal of Marketing Research, vol. XXVIII, Aug. 1991, 7 pages.
Edwards, Jim, "Apple Wants More Advertisers to Use Its iPhone Tracking System," Business Insider, Jun. 13, 2013. Retrieved from http://www.businessinsider.com/apples-idfa-and-ifa-tracking-system-2013-6, 2 pages.
Enoch et al., "Cracking the Cross-Media Code: How to Use Single-Source Measures to Examine Media Cannibalization and Convergence," Journal of Advertising Research, Jun. 2010, 13 pages.
Facebook for Business, "Measuring Conversions on Facebook, Across Devices and in Mobile Apps," Aug. 14, 2014. Retrieved from https://www.facebook.com/business/news/cross-device-measurement, 3 pages.
Goerg et al., "How Many Millenials Visit YouTube? Estimating Unobserved Events From Incomplete Panel Data Conditioned on Demographic Covariates," Google Inc., Apr. 27, 2015, 27 pages.
Goerg et al., "How Many People Visit YouTube? Imputing Missing Events in Panels With Excess Zeros," Google Inc., 2015, 6 pages.
Headen et al., "The Duplication of Viewing Law and Television Media Schedule Evaluation," Journal of Marketing Research, vol. XVI, Aug. 1979, 9 pages.
Hothorn et al., "Unbiased Recursive Partitioning: A Conditional Inference Framework," Journal of Computational and Graphical Statistics, vol. 15, No. 3, 2006, pp. 651-674, 21 pages.
Huang et al., "Modeling the Audience's Banner Ad Exposure for Internet Advertising Planning," Journal of Advertising, vol. 35, No. 2, Summer 2006, 15 pages.
The Nielsen Company, "How Teens Use Media: A Nielsen Report on the Myths and Realities of Teen Media Trends," Jun. 2009, 17 pages.
Rust et al., "A Comparative Study of Television Duplication Models," Journal of Advertising, vol. 10, No. 3, 1981, 6 pages.
Taboga, Marco, "Linear combinations of normal random variables", from "Lectures on probability and statistics," 2010, <http://www.statlect.com/normal_distribution_linear_combinations.htm>, 4 pages.
Whiting, Seth W., et al., "Creating an Iphone Application for Collecting Continuous ABC Data," Journal of Applied Behavior Analysis, vol. 45, No. 3, Fall 2012, p. 643-656.
Liu, et al., "Socialize Spontaneously with Mobile Application," INFOCOM 2012, Orlando, FL, Mar. 25-30, 2012, p. 1942-1950, 9 pages.
Evensen, Pal, et al, "AdScorer: An Event-Based System for Near Real-Time Impact Analysis of Televison Advertisements," DEBS'12, Jul. 16-20, 2012, p. 85-94, 10 pages.
Dhillon, Jaspaljeet Singh, et al., "Leveraging Consumer Sensing Devices for Telehealth," CHINZ 2012, Dundin, New Zealand, Jul. 2-3, 2012, p. 29-35, 7 pages.
Buyya, Rajkumar, et al., "Cloudbus Toolkit for Market-Oriented Cloud Computing," CloudCom 2009, LNCS 5931, Springer-Verlag, Berlin, Geimany, 2009, p. 24-44, 21 pages.
"ID3," Wikipedia, downloaded from: en.wikipedia.org/wiki/ID3 on Apr. 16, 2015, 15 pages.
"Software Development Kit," Wikipedia, downloaded from: en.wikipedia.org/Software_development_kit on Apr. 16, 2015, 2 pages.
United States Patent and Trademark Office, "Notice of Allowance," issued in connection with U.S. Appl. No. 15/251,954, dated Sep. 21, 2018, 10 pages.
United States Patent and Trademark Office, "Final Office Action," issued in connection with U.S. Appl. No. 15/251,954, dated Jun. 27, 2018, 9 pages.
United States Patent and Trademark Office, "Non-final Office Action," issued in connection with U.S. Appl. No. 15/251,954, dated Dec. 26, 2017, 7 pages.
United States Patent and Trademark Office, "Notice of Allowance," issued in connection with U.S. Appl. No. 15/251,954, dated Oct. 2, 2017, 7 pages.
United States Patent and Trademark Office, "Non-final Office Action," issued in connection with U.S. Appl. No. 15/251,954, dated Jun. 12, 2017, 7 pages.
United States Patent and Trademark Office, "Non-Final Office Action," issued in connection with U.S. Appl. No. 16/235,902, dated Jun. 28, 2019, 9 pages.

(56) References Cited

OTHER PUBLICATIONS

United States Patent and Trademark Office, "Non-Final Office Action," issued in connection with U.S. Appl. No. 16/235,902, dated Jan. 6, 2020, 11 pages.

United States Patent and Trademark Office, "Notice of Allowance and Fee(s) Due," issued in connection with U.S. Appl. No. 16/235,902, dated Jun. 25, 2020, 7 pages.

United States Patent and Trademark Office, "Non-Final Rejection," issued in connection with U.S. Appl. No. 17/087,109, dated Jun. 24, 2021, 9 pages.

United States Patent and Trademark Office, "Notice of Allowance and Fee(s) Due," issued in connection with U.S. Appl. No. 17/087,109, dated Oct. 27, 2021, 7 pages.

* cited by examiner

US 11,785,293 B2

METHODS AND APPARATUS TO COLLECT DISTRIBUTED USER INFORMATION FOR MEDIA IMPRESSIONS

RELATED APPLICATIONS

This patent arises from a continuation of U.S. patent application Ser. No. 17/087,109, filed Nov. 2, 2020, which is a continuation of U.S. patent application Ser. No. 16/235,902, filed Dec. 28, 2018, now U.S. Pat. No. 10,827,217, which is a continuation of U.S. patent application Ser. No. 15/251,954, filed Aug. 30, 2016, now U.S. Pat. No. 10,205,994, which claims the benefit of U.S. Provisional Patent Application No. 62/268,871, filed Dec. 17, 2015. U.S. patent application Ser. No. 17/087,109, U.S. patent application Ser. No. 16/235,902, U.S. patent application Ser. No. 15/251,954, and U.S. Provisional Patent Application No. 62/268,871 are hereby incorporated herein by reference in their entireties.

FIELD OF THE DISCLOSURE

The present disclosure relates generally to monitoring media and, more particularly, to methods and apparatus to collect distributed user information for media impressions.

BACKGROUND

Internet-based media delivery services enable Internet users to access media from different Internet media providers via their Internet service provider (ISP) connections. Internet-based media delivery services may be subscription services, may be pay-per-use services, and/or may be advertisement-supported services. Internet-based media delivery services may be accessed via personal computers, mobile devices, smart televisions, and/or dedicated over-the-top (OTT) devices (e.g., Roku media devices, AppleTV media devices, GoogleTV media devices, FireTV media devices, etc.).

When a user subscribes to an Internet-based media delivery service, the user registers with a server of the Internet-based media delivery service to access media via the Internet.

DETAILED DESCRIPTION

Figure 1:
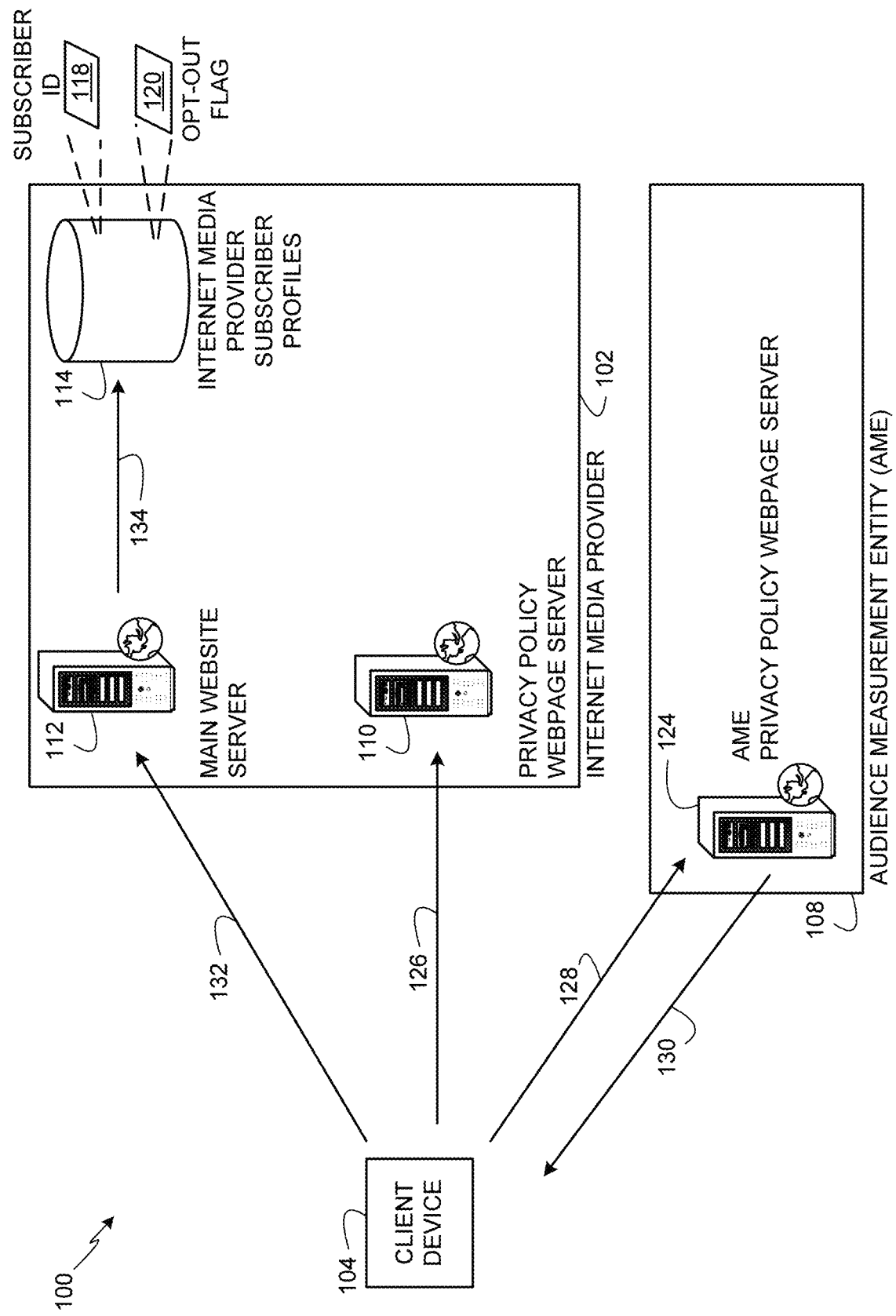
FIG. 1 depicts an example system to collect opt-out privacy preferences from users of an Internet media provider.

Techniques for monitoring user access to Internet resources such as webpages, advertisements, and/or other content has evolved significantly over the years. At one point in the past, such monitoring was done primarily through server logs. In particular, entities serving content on the Internet would log the number of requests received for their content at their server. Basing Internet usage research on server logs is problematic for several reasons. For example, server logs can be tampered with either directly or via zombie programs, which repeatedly request content from the server to increase the server log counts. Secondly, content is sometimes retrieved once, cached locally, and then repeatedly viewed from the local cache without involving the server in the repeat viewings. Server logs cannot track these views of cached content. Thus, server logs are susceptible to both overcounting and undercounting errors.

The inventions disclosed in Blumenau, U.S. Pat. No. 6,108,637, fundamentally changed the way Internet monitoring is performed and overcame the limitations of the server side log-monitoring techniques described above. For example, Blumenau disclosed a technique wherein Internet content to be tracked is tagged with beacon instructions. In particular, monitoring instructions are associated with the HTML (Hypertext Markup Language) of the content to be tracked. When a client requests the content, both the content and the beacon instructions are downloaded to the client. The beacon instructions are, thus, executed whenever the content is accessed, be it from a server or from a cache.

The beacon instructions cause monitoring data reflecting information about the access to the content to be sent from the client that downloaded the content to a monitoring entity. Typically, the monitoring entity is an audience measurement entity that did not provide the content to the client and who is a trusted third party for providing accurate usage statistics (e.g., The Nielsen Company, LLC). Advantageously, because the beaconing instructions are associated with the content and executed by the client browser whenever the content is accessed, the monitoring information is provided to the audience measurement company irrespective of whether the client is a panelist of the audience measurement company.

It is useful, however, to link demographics and/or other user information to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a device and/or user identifier (a device/user identifier) on a panelist device such as a desktop/laptop computer and/or mobile device that enables the audience measurement entity to identify the panelist whenever the panelist accesses tagged content and, thus, sends monitoring information to the audience measurement entity. In examples involving Internet-access applications or apps that accept cookies in connection with accessing Internet media (e.g., desktop web browsers that accept cookies, mobile web browsers that accept cookies, and/or any other Internet-access applications and/or apps that accept cookies), the audience measurement entity sets a cookie on the panelist device. In examples involving Internet-access applications or apps that do not accept cookies in connection with accessing Internet media (e.g., mobile apps and/or any other Internet-access applications and/or apps that do not accept cookies), the audience measurement entity sets and/or uses a non-cookie device/user identifier (and/or any local storage container such as HTML5 Local Data Stores) on the panelist device.

Since most of the clients providing monitoring information from the tagged pages are not panelists and, thus, are unknown to the audience measurement entity, it is necessary to use statistical methods to impute demographic information based on the data collected for panelists to the larger population of users providing data for the tagged content. However, panel sizes of audience measurement entities remain small compared to the general population of users. Thus, a problem is presented as to how to increase panel sizes while ensuring the demographic data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the computers of their subscribers to enable the database proprietor to recognize users when they visit the database proprietor's website. Some database proprietors set and/or employ non-cookie device/user identifiers on client devices for use with apps that do not use cookies.

The protocols of the Internet make cookies inaccessible outside of the domain (e.g., Internet domain, domain name, etc.) on which they were set. Thus, a cookie set in the Amazon.com domain is accessible to servers in the Amazon.com domain, but not to servers outside that domain. Therefore, although an audience measurement entity might find it advantageous to access the cookies set by the database proprietors, they are unable to do so. In addition, apps that run on mobile device platforms do not use cookies in the same way as web browsers. Although apps do present media that is worthy of impression tracking, prior techniques that use cookie-based approaches for tracking such media impressions are unusable in the app environment context.

The inventions disclosed in Mainak et al., U.S. Pat. No. 8,370,489, which is hereby incorporated by reference herein in its entirety, enable audience measurement entities (AMEs) to leverage the existing databases of database proprietors to collect more extensive Internet usage and demographic data by extending the beaconing process to encompass partnered database proprietors and by using such partners as interim data collectors. The inventions disclosed in Mainak et al. accomplish this task by structuring an AME to respond to beacon requests from clients (who may not be a member of an audience member panel and, thus, may be unknown to the audience member entity) and redirect the client from the audience measurement entity to a database proprietor, such as a social networking site partnered with the audience member entity. The redirection initiates a communication session between the client accessing the tagged media and the database proprietor. The database proprietor (e.g., Facebook) can access any cookie it has set on the client to thereby identify the client based on the internal records of the database proprietor. In the event that the client corresponds to a subscriber of the database proprietor, the database proprietor logs an impression in association with the demographic data associated with the client and subsequently forwards logged impressions to the audience measurement company. In the event that the client does not correspond to a subscriber of the database proprietor, the database proprietor may redirect the client to the audience measurement entity and/or another database proprietor. The audience measurement entity may respond to the redirection from the first database proprietor by redirecting the client to a second, different database proprietor that is partnered with the audience measurement entity. That second database proprietor may then attempt to identify the client, as explained above. This process of redirecting the client from database proprietor to database proprietor can be performed any number of times until the client is identified and the content exposure logged, or until all database partners have been contacted without a successful identification of the client. The redirections all occur automatically, so the user of the client is not involved in the various communication sessions and may not even know they are occurring.

Periodically or aperiodically, the partnered database proprietors provide their logs and demographic information to the audience measurement entity, which then compiles the collected data into statistical reports accurately identifying the demographics of persons accessing the tagged media. Because the identification of clients is done with reference to enormous databases of users far beyond the quantity of persons present in a conventional audience measurement panel, the data developed from this process is extremely accurate, reliable, and detailed.

Significantly, because the audience measurement entity remains the first leg of the data collection process (e.g., receives the request generated by the beacon instructions from the client), the audience measurement entity is able to obscure the source of the media access being logged as well as the identity of the media itself from the database proprietors (thereby protecting the privacy of the media sources), without compromising the ability of the database proprietors to log impressions for their subscribers. Further, when cookies are used as device/user identifiers, the Internet security cookie protocols are complied with because the only servers that access a given cookie are associated with the Internet domain (e.g., Facebook.com) that set that cookie.

Examples disclosed in Mainak et al. (U.S. Pat. No. 8,370,489) can be used to determine any type of media impressions or exposures (e.g., content impressions, advertisement impressions, content exposure, and/or advertisement exposure) using demographic information, which is distributed across different databases (e.g., different website owners, service providers, etc.) on the Internet. Not only do such disclosed examples enable more accurate correlation of Internet advertisement exposure to demographics, but they also effectively extend panel sizes and compositions beyond persons participating in the panel of an audience measurement entity and/or a ratings entity to persons registered in other Internet databases, such as the databases of social media sites such as Facebook, Twitter, Google, etc. Such extensions effectively leverage the media tagging capabilities of the ratings entity and the use of databases of nonratings entities, such as social media and other websites, to create an enormous, demographically accurate panel that results in accurate, reliable measurements of exposures to Internet media, such as advertising and/or programming.

The inventions disclosed in Burbank et al., U.S. Pat. No. 8,930,701, which is hereby incorporated by reference herein in its entirety, enable audience measurement entities to leverage the existing databases of database proprietors to collect more extensive Internet usage and demographic data and/or user data for associating with media impressions tracked on devices that execute apps that do not employ cookies, which are more commonly used in web browsers. Burbank et al. overcome numerous challenges faced by audience measurement entities in accomplishing this end. For example, Burbank et al. disclosed how to access the data of the database proprietors without compromising the privacy of the subscribers, the panelists, or the proprietors of the tracked content. Burbank et al. also disclosed how to access this data given the technical restrictions imposed by app software platforms of mobile devices that do not employ cookies.

Many Internet media providers that provide media and services over the Internet, such as Twitter, CNN, the New York Times, Hulu, Amazon, etc., would like to measure the media access habits of audience members. However, due to Internet privacy policies, such Internet media providers must provide "opt-out" options for users who do not wish to have their Internet activities tracked using third-party tracking technologies. In some instances, Internet media providers have gone further by enforcing site-wide policies that prohibit third-party entities from performing tracking using techniques that would transmit impression requests (e.g., beacon requests) from the Internet media provider websites to third-party impression collection servers. In this manner, the Internet media providers ensure that all users, regardless of whether they choose to "opt out" of third-party tracking, will not have their Internet activities on the Internet media providers' websites tracked by third-party entities. Such third-party tracking prevention policies make it difficult to use the teachings of Mainak et al. (U.S. Pat. No. 8,370,489) to collect impressions for Internet media because such teachings send impression requests for accessed Internet media to third-party servers to log impressions and/or obtain the demographics of Internet users. However, broadly applying such protections to all users, regardless of whether they are opt-out or non-opt-out users, limits the Internet media providers' abilities to track Internet activities of the non-opt-out users. That is, some users may not elect to opt out of third-party tracking. As such, although an Internet media provider has an opportunity to track Internet activities of such non-opt-out users, the Internet media provider's general policy to prevent any third-party tracking does not allow third-party tracking of even the non-opt-out users.

As explained above, leveraging existing databases of third-party database proprietors is advantageous because of the opportunity that it creates to collect more extensive Internet usage and demographic data and/or user data for associating with media impressions tracked on devices. As such, even though Internet media providers may enforce site-wide policies against third-party tracking for all opt-out users and non-opt-out users, such Internet media providers would still like to benefit from being able to use third-party tracking of Internet activities associated with non-opt-out users without compromising the privacy of opt-out users.

Examples disclosed herein enable Internet media providers to partner and work with audience measurement entities and/or third-party database proprietors to be able to measure Internet activities of non-opt-out users so that impressions can be logged for media accessed via the Internet by those non-opt-out users and so that the demographics corresponding to such non-opt-out users can be obtained without compromising the privacy safeguards elected by the opt-out users. Examples disclosed herein additionally or alternatively enable obtaining such demographics corresponding to non-opt out users without violating corporate policies of Internet media providers and/or database proprietors such as policies against Internet universe resource locator (URL) calls being made outside the domain(s) of the Internet media providers and/or database providers, policies against downloading software not written or provided by the Internet media providers and/or database proprietors. In this manner, the Internet media providers and/or database proprietors can have more control over performance (e.g., website speed), more control over user experience, more control over software configuration management (e.g., to better control software being run on their websites, to substantially reduce or prevent HTTP 404 Not Found error messages, etc.), and limiting risk of malware from being downloaded to users of the Internet media providers and/or database proprietors via third parties.

Examples disclosed herein can be used to determine content impressions, advertisement impressions, content exposure, advertisement exposure, and/or any other type of media impressions and/or exposure using user information, which is distributed across different databases (e.g., different website owners, service providers, etc.) on the Internet. Not only do examples disclosed herein enable more accurate correlation of Internet media exposure to user information, but they also effectively extend panel sizes and compositions beyond persons participating in the panel of an audience measurement entity and/or a ratings entity to persons registered in other Internet databases of database proprietors, such as the databases of wireless service carriers, mobile software/service providers, social media sites (e.g., Facebook, Twitter, Google, etc.), and/or any other Internet sites, such as Yahoo!, MSN, Apple iTunes, Experian, etc. This extension effectively leverages the media impression tracking capabilities of the audience measurement entity and the use of databases of non-AME entities, such as social media and other websites, to create an enormous, demographically accurate panel that results in accurate, reliable measurements of exposures to Internet content, such as advertising and/or programming.

Traditionally, audience measurement entities (also referred to herein as "ratings entities") determine demographic reach for advertising and media programming based on registered panel members. That is, an audience measurement entity enrolls people who consent to being monitored into a panel. During enrollment, the audience measurement entity receives demographic information from the enrolling people so that subsequent correlations may be made between advertisement/media exposure to those panelists and different demographic markets. Unlike traditional techniques, in which audience measurement entities rely solely on their own panel member data to collect demographics-based audience measurement, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographic information from external sources (e.g., database proprietors), thus extending the coverage, accuracy, and/or completeness of their demographics-based audience measurements. Such access also enables the audience measurement entity to monitor persons who would not otherwise have joined an audience measurement panel. Any entity having a database identifying the demographics of a set of individuals may cooperate with the audience measurement entity. Such entities may be referred to as "database proprietors" and include entities such as wireless service carriers, mobile software/service providers, social media sites (e.g., Facebook, Twitter, Google, etc.), and/or any other Internet sites, such as Yahoo!, MSN, Apple iTunes, Experian, etc.

Examples disclosed herein may be implemented by Internet media providers and an audience measurement entity (e.g., any entity interested in measuring or tracking audience exposures to advertisements, content, and/or any other media) in cooperation with any number of database proprietors, such as online web services providers, to develop online media exposure metrics. Such database proprietors/online web services providers may be wireless service carriers, mobile software/service providers, social networking sites (e.g., Facebook, Twitter, MySpace, etc.), multiservice sites (e.g., Yahoo!, Google, Experian, etc.), online retailer sites (e.g., Amazon.com, Buy.com, etc.), and/or any other web service(s) sites that maintain user registration records.

In some examples, to increase the likelihood that measured audienceship or viewership is accurately attributed to the correct demographics, examples disclosed herein use user information located in the audience measurement entity's records and/or user information located at one or more database proprietors that maintain records or profiles of users having accounts therewith. In this manner, examples disclosed herein may be used to supplement user information maintained by a ratings entity (e.g., an audience measurement entity such as The Nielsen Company of Schaumburg, Ill., United States of America, which collects media exposure measurements, demographics, and/or other user information) with user information from one or more different database proprietors.

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data and/or other user information to identify demographics of users, and use server impression counts and/or other techniques to track quantities of impressions attributable to those users. Online web service providers such as wireless service carriers, mobile software/service providers, social networking sites (e.g., Facebook, Twitter, MySpace, etc.), multiservice sites (e.g., Yahoo!, Google, Experian, etc.), and online retailer sites (e.g., Amazon.com, Buy.com, etc.), etc. (collectively and individually referred to herein as online database proprietors) maintain detailed demographic information (e.g., age, gender, geographic location, race, income level, education level, religion, etc.) collected via user registration processes. An impression corresponds to a home or individual having been exposed to the corresponding media content and/or advertisement. Thus, an impression represents a home or an individual having been exposed to an advertisement or content or group of advertisements or content. In Internet advertising, a quantity of impressions or impression count is the total number of times an advertisement or advertisement campaign has been accessed by a web population (e.g., including number of times accessed as decreased by, for example, pop-up blockers and/or increased by, for example, retrieval from local cache memory).

FIG. 1 depicts an example system 100 to collect opt-out privacy preferences from users of an example Internet media provider 102. In the illustrated example, a user accesses media of the Internet media provider 102 via an example client device 104. The example client device 104 may be any device capable of presenting media received via network communications, such as a mobile phone, a mobile communication device, a tablet, a gaming device, a portable media presentation device, an Internet appliance, a smart television, an Internet terminal, a computer, a laptop, etc. In some examples, the client device 104 is an over-the-top (OTT) device that accesses or streams media from the Internet media provider 102. Example OTT devices include a Roku media device, an AppleTV media device, a GoogleTV media device, a FireTV media device, a gaming console (e.g., a Microsoft Xbox gaming console, a Sony PlayStation gaming console, etc.), a smart DVD player, an audio-streaming device, etc. An example OTT device decodes media received from the Internet media provider 102 and outputs the decoded media to a media presentation device for presentation. Example media presentation devices may be televisions, monitors, audio receivers, audio amplifiers, etc. In some examples, an OTT device is integrated in a media presentation device (e.g., smart televisions, connected televisions, etc.).

The example Internet media provider 102 is an entity that provides Internet-based media and/or services via websites and/or mobile apps. For example, the Internet media provider 102 may be Twitter, CNN, the New York Times, Netflix, Hulu, Amazon, or any other Internet-based service. In the illustrated example, an opt-out privacy preference is an option that users may select to not allow third-party tracking of their Internet activities on websites served by the Internet media provider. To collect and enforce opt-out privacy preference selections of users, the Internet media provider 102 works with an example audience measurement entity (AME) 108. In the illustrated example, the AME 108 performs third-party tracking of Internet activities. As such, when a user elects to opt-out of third-party tracking in connection with the Internet media provider 102, the AME 108 is not allowed to perform tracking of that user's Internet activities on websites served by the Internet media provider 102. In the illustrated example, the Internet media provider 102 and the AME 108 operate in separate Internet domains. As such, when third-party tracking involves cookies, cookies set on the client device 104 by the Internet media provider 102 are not accessible to the AME 108, and cookies set on the client device 104 by the AME 108 are not accessible by the Internet media provider 102 due to Internet privacy standards. When third-party tracking involves non-cookie device/user IDs, a device/user ID corresponding to the Internet media provider 102 may not be accessible to the AME 108.

In the illustrated example, the Internet media provider 102 includes an example privacy policy webpage server 110, an example main website server 112, and an example Internet media provider subscriber profiles database 114 (e.g., an example subscriber profiles database 114). The example privacy policy webpage server 110 serves a privacy policy webpage of the Internet media provider 102 to users along with a user-selectable option to opt out of third-party tracking. In the illustrated example, the user-selectable option to opt out of third-party tracking redirects users to a privacy policy webpage of the AME 108. The example main website server 112 serves webpages of the Internet media provider 102 to users so that users can access and/or interact with media, services, and/or any information provided by the Internet media provider 102. In examples disclosed herein, media includes advertisements, video, audio, text, graphics, webpages, news, educational media, entertainment media, or any other type of media. The example subscriber profiles database 114 is used by the Internet media provider 102 to store subscriber account information, including subscriber identifiers 118 and opt-out flags 120. The subscriber identifiers 118 may be login usernames, user handles, user screen names, and/or any other identifier used by the Internet media provider 102 to uniquely identify its registered subscribers (e.g., a Twitter user ID if the Internet media provider 102 is Twitter, a Facebook user ID if the Internet media provider 102 is Facebook, a Google user ID if the Internet media provider 102 is Google, etc.). The opt-out flags 120 are indicative of whether corresponding subscribers of the Internet media provider 102 have elected the opt-out option to prevent third-party tracking of their Internet activities of websites of the Internet media provider 102. As such, the opt-out flags 120 are indicative of which subscribers are opt-out users and which subscribers are non-opt-out users.

The AME 108 of the illustrated example includes an example AME privacy policy webpage server 124. The example AME privacy policy webpage server 124 serves a privacy policy webpage of the AME 108 to users along with a user-selectable option to opt out of third-party tracking.

In operation, to set an opt-out preference with the Internet media provider 102, a user visits a privacy policy webpage served by the privacy policy webpage server 110 of the Internet media provider 102, as indicated at reference number 126. On the privacy policy webpage of the Internet media provider 102, there is a disclosure that the Internet media provider 102 uses the AME 108 for third-party tracking. The privacy policy webpage of the Internet media provider 102 also provides a hyperlink to direct the client device 104 to the AME's privacy policy webpage. When the user selects the hyperlink, the user is redirected to a privacy policy webpage served by the AME privacy policy webpage server 124 of the AME 108, as shown at reference number 128.

On the privacy policy webpage of the AME 108, there is a user-selectable opt-out option to opt out of participation in the AME's third-party tracking for all browser interactions with webpages of the Internet media provider 102. When the user selects the user-selectable opt-out option, the AME privacy policy webpage server 124 sets an AME opt-out flag or setting on the client device 104, as shown at reference number 130. In some examples, the AME opt-out flag or setting is in the form of an opt-out cookie. Additionally or alternatively, the AME opt-out flag or setting is in the form of a bit and/or parameter setting in a configuration field to be stored at the client device 104. Also at reference number 130, the AME privacy policy webpage server 124 sends the client device 104 a hypertext transfer protocol (HTTP) redirect response to instruct the client device 104 to send an HTTP request to the main website server 112 of the Internet media provider 102 to inform the Internet media provider 102 that the user has elected to opt out of participation in third-party tracking. In the illustrated example, in response to the HTTP redirect from the AME privacy policy webpage server 124, the client device 104 sends the HTTP request to the client device 102, as shown at reference number 132. The HTTP request communicated by the client device 104 at reference number 132 includes the subscriber ID 118 of the user of the client device 104 and the opt-out flag 120, indicative of the user's opt-out preference election. In the illustrated example, the HTTP request of reference number 132 is a "dummy" request for an image (e.g., a 1×1 pixel). In some examples, the main website server 112 may respond to the client device 102 with the requested image (e.g., a 1×1 pixel) or may not respond at all to the HTTP request. However, a response by the main website server 112 to the HTTP request from the client device 104 at reference number 132 is not necessary so long as the main website server 112 receives the HTTP request, including the subscriber ID 118 and the opt-out flag 120, indicative of the user's opt-out preference selection.

When the main website server 112 receives the subscriber ID 118 and the opt-out flag 120, the main website server 112 stores the opt-out flag 120 as set (e.g., to disable third-party tracking) in association with the subscriber ID 118 in the subscriber profiles database 114 for the user of the client device 104 at reference numeral 134. However, in examples in which the client device 104 does not provide the subscriber ID 118 at reference number 132, the main website server 112 does not store the received opt-out flag 120 in the subscriber profiles database 114, because the main website server 112 would not be able to identify the user of the client device 104 without the subscriber ID 118.

In examples in which the client device 104 is a computer or other device capable of executing a web browser that accepts cookies, the subscriber ID 118 of the user may be obtained by the main website server 112, based on an Internet media provider cookie set in the client device 104 and communicated to the main website server 112 at reference number 132. In examples in which the client device 104 is an OTT device that does not support cookies, the subscriber ID 118 (which may be hashed) could be included by the privacy policy webpage server 110 in a uniform resource locator (URL) link that directs the OTT client device 104 to the AME privacy policy webpage server 124. In this manner, the OTT client device 104 uses the URL link from the privacy policy webpage server 110 to provide the subscriber ID 118 to the AME privacy policy webpage server 124 in the URL at reference number 128, and the AME privacy policy webpage server 124 returns the subscriber ID 118 to the OTT client device 104 for placement by the OTT client device 104 in a parameter of the HTTP request sent by the OTT client device 104 to the main website server 112 of the Internet media provider 102 at reference number 132.

In some alternative examples, the privacy policy webpage of the AME 108 could be copied to and served by the privacy policy webpage server 110 of the Internet media provider 102. In such alternative examples, the user of the client device 104 may select an opt-out preference via the privacy policy webpage server 110, corresponding to the AME third-party tracking. As such, the privacy policy webpage server 110 could log the opt-out flag 120 in association with the subscriber ID 118 in the subscriber profiles database 114, without requiring the user to separately visit the AME privacy policy webpage served by the AME privacy policy webpage server 124 to select the opt-out preference. In such alternative examples, the privacy policy webpage server 110 could send the opt-out flag 120 to the AME 108 to inform the AME 108 that the user of the client device 104 has selected to opt out of third-party tracking.

Figure 2:
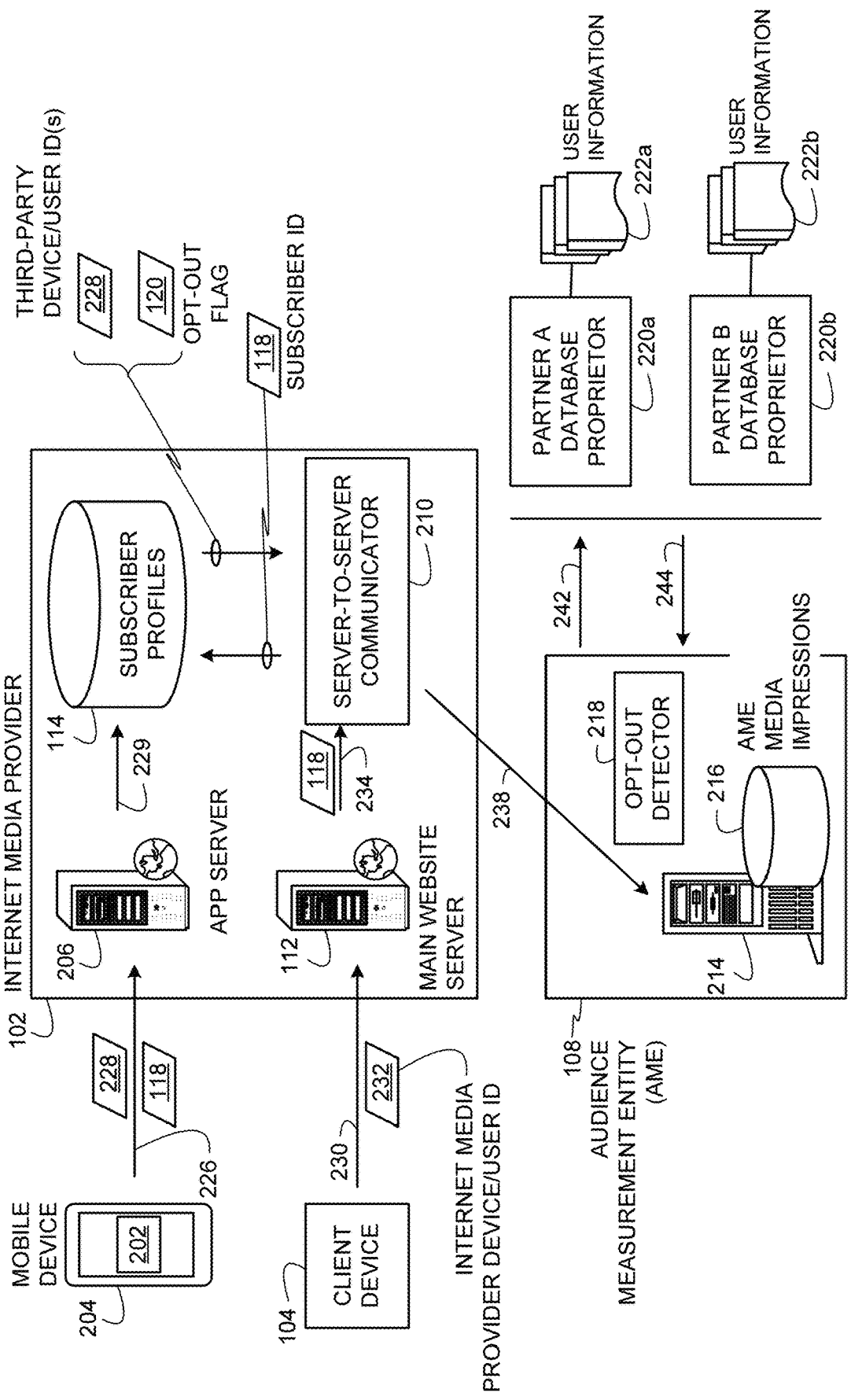
FIG. 2 depicts an example system to collect impressions and demographic information corresponding to usage of an example mobile app corresponding to the example Internet media provider of FIG. 1.

FIG. 2 depicts an example system 200 to collect impressions and demographic information corresponding to usage of an example app program 202, corresponding to the example Internet media provider 102 of FIG. 1. In the illustrated example, the app program 202 is installed on and executed by a mobile client device 204 (e.g., a mobile device 202). For example, the mobile device 202 may be a mobile phone, a tablet, a gaming device, a mobile media presentation device, or any other mobile device that executes apps for accessing Internet media from, for example, the Internet media provider 102. In the illustrated example, the Internet media provider 102 includes an example app server 206 to serve media to the app program 202. In the illustrated example, the same user uses both the mobile device 204 and the client device 104 to access media from the Internet media provider 102.

In the illustrated example, the Internet media provider 102 includes a server-to-server communicator 210 to perform server-to-server communications with the AME 108. In the illustrated example, the AME 108 includes an example AME impression collection server 214 to log impressions in an example AME media impressions database 216. The AME 108 of the illustrated example also includes an example opt-out detector 218 to determine when users have elected to opt out of participating in third-party tracking. In the illustrated example, the example server 214 sends impression information to example database proprietors 220a, 220b to receive user information 222a, 222b from the database proprietors 220a, 220b corresponding to the impression information. In this manner, the AME 108 can log demographic impressions. In the illustrated example, user information or user data 222a, 222b includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. In examples disclosed herein, a demographic impression is defined to be an impression that is associated with a characteristic (e.g., a demographic characteristic) of a person exposed to media.

In operation in the illustrated example, a user uses the app program 202 to log into a user account at the Internet media provider 102 at reference number 226. In the login process at reference number 226, the example app program 202 sends the subscriber ID 118 of the user and one or more third-party device/user identifier(s) 228 set in the mobile device 204. In some examples, the third-party device/user identifier(s) 228 are hashed or encrypted to prevent any intermediate or intercepting parties from discovering the identity of the user of the mobile device 204. Example manners that may be used to send the subscriber ID 118 and the third-party device/user identifier(s) 228 to the app server 206 are disclosed in U.S. Pat. No. 8,930,701, which is incorporated by reference herein in its entirety.

In the illustrated example, the third-party device/user identifier(s) 228 is an identifier that can be used by corresponding ones of the partner database proprietors 220a-b to identify the user of the mobile device 204, and to locate user information 222a-b corresponding to the user in subscriber account profiles/records of those partner database proprietors 220a-b. For example, the third-party device/user identifier(s) 228 may be non-cookie device/user identifiers that include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), a unique device identifier (UDID) (e.g., a non-proprietary UDID or a proprietary UDID such as used on the Microsoft Windows platform), an open-source unique device identifier (OpenUDID), an open device identification number (ODIN), a login identifier (e.g., a username), an email address, user agent data (e.g., application type, operating system, software vendor, software revision, etc.), an Ad-ID (e.g., an advertising ID introduced by Apple, Inc. for uniquely identifying mobile devices for the purposes of serving advertising to such mobile devices), an Identifier for Advertisers (IDFA) (e.g., a unique ID for Apple iOS devices that mobile ad networks can use to serve advertisements), a Google Advertising ID, a Roku ID (e.g., an identifier for a Roku OTT device), third-party service identifiers (e.g., advertising service identifiers, device usage analytics service identifiers, demographics collection service identifiers), etc. In some examples, fewer or more device/user identifier(s) 228 may be used. In addition, although only two partner database proprietors 220a-b are shown in FIG. 2, the AME 108 may partner with any number of partner database proprietors to collect distributed user information (e.g., the user information 222a-b).

In some examples, the types of third-party device/user identifiers 228 are different from device to device, depending on the type of device, the manufacturer of the device, the software installed on the device, etc. For example, a mobile device having cellular 2G, 3G, and/or 4G capabilities will have an assigned IMEI number. However, a mobile device capable of Wi-Fi, but not having cellular communication capabilities, will not have an IMEI number. As such, one or more other parameter(s) of the Wi-Fi mobile device may be used as the device/user identifiers 228. Such other parameters may include, for example, a MAC address, a login ID, or any other identifier or information available to the Wi-Fi capable device and that is not specific to cellular communications.

By being able to select or access multiple different types of third-party device/user identifiers 228, the AME 108 increases the opportunities for collecting corresponding user information from partner database proprietors, such as the partner database proprietors 220a-b. For example, the AME 108 is not tied to requesting user information from a single source (e.g., only one of the partner database proprietors 220a-b). Instead, the AME 108 can leverage relationships with multiple partner database proprietors (e.g., the partner database proprietors 220a-b). If one or some partner database proprietors are unable or become unwilling to share user data, the AME 108 can request the user data from one or more other partner database proprietor(s).

In some examples, the mobile device 204 may not allow access to identification information stored in the mobile device 204. For such instances, the disclosed examples enable the AME 108 to store an AME-provided identifier (e.g., an identifier managed and tracked by the AME 108) in the mobile device 204 to track media impressions on the mobile device 204. For example, the AME 108 may provide instructions in the app program 202 to set an AME-provided identifier in memory space accessible by and/or allocated to the app program 202, and the app program 202 uses the identifier as a third-party device/user identifier 228. In such examples, the AME-provided identifier set by the app program 202 persists in the memory space even when the app program 202 is not running. In this manner, the same AME-provided identifier can remain associated with the mobile device 204 for extended durations. In some examples in which the app program 202 sets an identifier in the mobile device 204, the AME 108 may recruit a user of the mobile device 204 as a panelist, and may store user information collected from the user during a panelist registration process and/or collected by monitoring user activities/behavior via the mobile device 204 and/or any other device used by the user and monitored by the AME 108. In this manner, the AME 108 can associate user information of the user (from panelist data stored by the AME 108) with media impressions attributed to the user on the mobile device 204.

After the login process at reference number 226, the app server 206 stores the third-party device/user identifier(s) 228 in association with the subscriber ID 118 in the subscriber profiles database 114 in a subscriber profile of the user of the mobile device 204 at reference number 229. At some later time (e.g., minutes later, hours later, days later, etc.), the user of the mobile device 204 uses a web browser or other user interface of the client device 104 to log into a service of the Internet media provider 102 via the main website server 112 at reference number 230. In the illustrated example, when the client device 104 is accessing webpages or other Internet-accessible information of the Internet media provider 102, the client device 104 cannot send a third-party tracking communication to the AME 108 due to the general policy of preventing any third-party tracking that is enforced by the Internet media provider 102 for all opt-out and non-opt-out users.

During the login process at reference number 230, the main website server 112 of the Internet media provider 102 obtains an Internet media provider device/user ID 232 that is on the client device 104. In this manner, the Internet media provider 102 can use the Internet media provider device/user ID 232 to identify the subscriber ID 118 of the user of the client device 104. In some examples, the Internet media provider device/user ID 232 is the subscriber ID 118 or includes the subscriber ID 118 in hashed or encrypted format or in non-hashed or non-encrypted format. In such examples, the Internet media provider 102 can access the subscriber ID 118 directly from the Internet media provider device/user ID 232. In other examples, the Internet media provider device/user ID 232 may be an identifier that is different from the subscriber ID 118 and that does not, alone, reveal an identity of a user corresponding to the subscriber ID 118. That is, while the subscriber ID 118 may be a login username, a user handle, a user screen name, etc. which, by itself, could be used by others that are not the Internet media provider 102 to identify the corresponding user, the Internet media provider device/user ID 232 can be a string of alphanumeric characters and/or symbols that, alone, does not reveal a user identity. In such examples in which the Internet media provider device/user ID 232 is an identifier different from the subscriber ID 118, the Internet media provider 102 stores the Internet media provider device/user ID 232 in association with the corresponding subscriber ID 118 in the subscriber profiles 114 so that the subscriber ID 118 can be determined by the Internet media provider 102 based on the Internet media provider device/user ID 232.

For examples in which the client device 104 is a device that employs cookies (e.g., a device that executes a web browser or apps that employ cookies), the Internet media provider device/user ID 232 may be a cookie (e.g., a cookie that includes the subscriber ID 118 or a cookie that does not include the subscriber ID 118 but can be used to access the subscriber ID 118 in the subscriber profiles database 114). For examples in which the client device 104 is an OTT device that does not employ cookies, the OTT client device 104 may alternatively send non-cookie identifier as the device/user ID 232 that is associated with the OTT client device 104 or an app program on the OTT client device 104 to the main website server 112 at reference number 230 so that the Internet media provider 102 may use such non-cookie identifier from the OTT client device 104 to identify the subscriber ID 118 of the user of the OTT client device 104. For example, the non-cookie identifier used as the device/user ID 232 can include the subscriber ID 118 or, if it does not include the subscriber ID 118, can be used to access the subscriber ID 118 in the subscriber profiles database 114. Examples usable by the OTT client device 104 for communicating identifiers associated with the OTT client device 104 or an app program on the OTT client device 104 to the Internet media provider 102 are disclosed in Splaine et al., U.S. patent application Ser. No. 14/823,621, filed on Aug. 11, 2015, and titled, "Methods and Apparatus to Collect Impressions Associated with Over-The-Top Media Devices," which is hereby incorporated by reference herein in its entirety.

In the illustrated example, the main website server 112 determines the subscriber ID 118 based on the Internet media provider device/user ID 232 received at reference number 230. For example, the main website server 112 can access the subscriber ID 118 directly from the Internet media provider device/user ID 232 or can access the subscriber ID 118 in the subscriber profiles database 114 by performing a look-up operation in the subscriber profiles database 114 based on the Internet media provider device/user ID 232. At reference number 234, the example main website server 112 sends the subscriber ID 118 to the example server-to-server communicator 210. In the illustrated example, the server-to-server communicator 210 uses the subscriber ID 118 to look up the subscriber profile of the user of the client device 104 in the subscriber profiles database 114. In this manner, the example server-to-server communicator 210 can obtain the third-party device user identifier(s) 228 that were stored in the subscriber profile by the app server 206 at reference number 229 and the corresponding opt-out flag 120 (FIG. 1) that was stored in the subscriber profiles database 114 at reference number 134 of FIG. 1. In this manner, locating the corresponding third-party device user identifier(s) 228 and the opt-out flag 120 based on the subscriber ID 118 obtained at reference number 234, the Internet media provider 102 can elect to track exposures to media accessed by the corresponding user via the client device 104, so long as the opt-out flag 120 corresponding to the user does not indicate that the user elected to opt out of participation in third-party tracking.

Although FIG. 2 shows that the main website server 112 sends the subscriber ID 118 to the example server-to-server communicator 210 at reference number 234, in other examples, the main website server 112 may instead send the Internet media provider device/user ID 232 to the example server-to-server communicator 210 at reference number 234. In such examples, the server-to-server communicator 210 obtains the third-party device user identifier(s) 228 and the corresponding opt-out flag 120 from the subscriber profiles database 114 based on the Internet media provider device/user ID 232.

When there is media on a webpage of the Internet media provider 102, accessed by the client device 104, that the Internet media provider 102 would like tracked or measured for impressions by the AME 108, the example server-to-server communicator 210 sends a server-to-server ping or communication to the AME impression collection server 214 at reference number 238. In the illustrated example, the server-to-server ping or communication at reference number 238 includes the opt-out flag 120 (FIG. 1) corresponding to the user of the client device 104, the third-party device/user identifier(s) 228, and a media identifier of the accessed media that the Internet media provider 102 would like tracked or measured. In the illustrated example, the AME impression collection server 214 logs a media impression in the AME media impressions database 216 for the accessed media. In addition, the example opt-out detector 218 of the AME impression collection server 214 checks the opt-out flag 120 to determine whether the user has elected to opt out of participating in third-party tracking. If the opt-out detector 218 determines the opt-out flag 120 indicates that the user has opted out of third-party tracking, the AME impression collection server 214 does nothing further based on the server-to-server ping at reference number 238. That is, the media impression logged in the AME media impression database 216 for the accessed media remains an anonymous impression, without associating it with any demographics of the user.

If the AME impression collection server 214 determines that the opt-out flag 120 indicates that the user has not elected to opt out of participating in third-party tracking, the AME impression collection server 214 sends corresponding ones of the third-party device/user identifier(s) 228 from the server-to-server ping to corresponding ones of the database proprietors 220*a-b* at reference number 242 along with a request for corresponding user information. In this manner, the AME impression collection server 214 can obtain user information 222*a-b* from the database proprietors 220*a-b*, corresponding to the user of the client device 104 and the mobile device 204 at reference number 244. For example, the AME impression collection server 214 identifies which of the third-party device/user identifier(s) 228 correspond to which of the database proprietors 220*a-b*, such that the identifier(s) 228 are usable by the database proprietors 220*a-b* to look-up corresponding user information 222*a-b*. For example, if the database proprietor 220*a* is a wireless carrier, the AME impression collection server 214 sends one of the third-party device/user identifier(s) 228 that is an IMEI number to the database proprietor 220*a*, because as a wireless carrier, the database proprietor 220*a* stores the user information 222*a* in association with the IMEI number. In some examples, the AME impression collection server 214 selects an industry-standard device/user identifier, such as an Apple Ad-ID from the third-party device/user identifier(s) 228 to send to one or both of the database proprietors 220*a-b*. In such examples, the industry-standard device/user identifier is accessible and usable by any participating database proprietor 220*a-b* to store in association with user information 222*a-b*. As such, any database proprietor 220*a-b* can use the industry-standard device/user identifier to return corresponding user information 222*a-b* for a user of the client device 104 and the mobile device 204 to the AME 108. Examples that may be used by the AME impression collection server 214 to determine which ones of the third-party device/user identifiers 228 correspond to which database proprietors 220*a-b* are disclosed in Burbank et al., U.S. Pat. No. 8,930,701, which is hereby incorporated by reference herein in its entirety.

When the AME impression collection server 214 receives the user information 222*a-b* from the database proprietors 220*a-b* at reference numeral 244, the AME impression collection server 214 stores the user information 222*a-b* in the AME media impressions database 216 in association with a logged impression to log a demographic impression. In some examples, the database proprietors 220*a-b* send user-level user information 222*a-b* to the AME impression collection server 214 at reference number 244. In other examples, the database proprietors 220*a-b* send aggregate user information 222*a-b* to the AME impression collection server 214 at reference number 244 for the corresponding media being measured. For example, the AME impression collection server 214 may send the database proprietors 220*a-b* numerous third-party device/user identifiers 228 corresponding to numerous users who accessed the same media being measured. In such examples, the database proprietors 220*a-b* can return user information 222*a-b* in the aggregate for all of the numerous users. In this manner, the database proprietors 220*a-b* does not reveal specific user-level demographics about specific ones of their subscribers to the AME 108. Instead, in such aggregate user information, the AME 108 receives collections of demographic buckets or groups showing percentages or numbers of people in different demographic segments that accessed the media being measured (e.g., of all the users that accessed the media, 23% of media impressions corresponded to 18-25 year-old males (M18-25), 20% of media impressions corresponded to 18-25 year-old females (M18-25), etc.).

Figure 3:
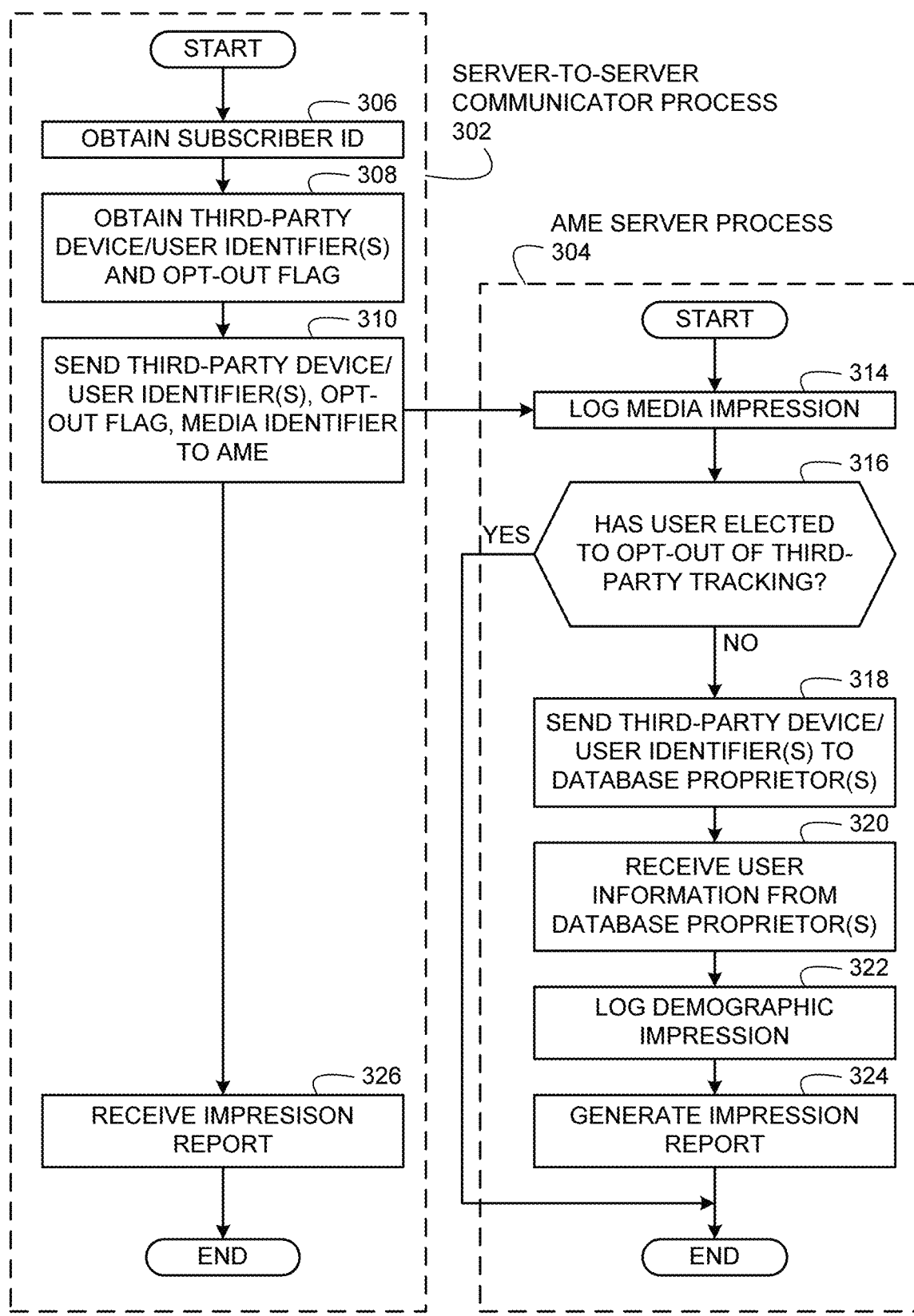
FIG. 3 depicts flows diagrams representative of example machine-readable instructions that may be executed to implement the example server-to-server communicator and the example audience measurement entity (AME) impression collection server of FIG. 2.

FIG. 3 depicts flow diagrams representative of example machine-readable instructions that may be executed to implement the example server-to-server communicator 210 and the example AME impression collection server 214 of FIG. 2. The flow diagrams of FIG. 3 include an example server-to-server communicator process 302 and an example AME server process 304. Initially, at the example server-to-server communicator process 302, the example server-to-server communicator 210 obtains the subscriber ID 118 (block 306). For example, the server-to-server communicator 210 receives the subscriber ID 118 from the main website server 112 at reference numeral 234, as described above in connection with FIG. 2. The example server-to-server communicator 210 then obtains the third-party device/user identifier(s) 228 and the opt-out flag 120 (block 308). For example, the server-to-server communicator 210 obtains the third-party device/user identifier(s) 228 and the opt-out flag 120 from the subscriber profiles database 114 based on the subscriber ID 118, as described above in connection with FIG. 2. The example server-to-server communicator 210 sends the third-party device/user identifier(s) 228, the opt-out flag 120, and a media identifier to the AME 108 (block 310). For example, the example server-to-server communicator 210 uses a server-to-server ping or communication to send the third-party device/user identifier(s) 228, the opt-out flag 120, and the media identifier of the media to be measured to the AME impression collection server 214 at reference number 238 as described above in connection with FIG. 2.

Turning to the AME server process 304, the AME impression collection server 214 logs a media impression for the accessed media to be measured (block 314). For example, the AME impression collection server 214 logs the media impression in the AME media impressions database 216 based on the media identifier received from the server-to-server communicator 210 at block 310. The example opt-out detector 218 (FIG. 2) determines whether the user has elected to opt out of participation in third-party tracking (block 316). For example, the opt-out detector 218 determines whether the opt-out flag 120 indicates that the user has elected to opt out of participation in third-party tracking. If the user has elected to opt out of third-party tracking (block 316), the example process 304 ends. In such examples, the media impression logged in the AME media impressions database 216 at block 314 remains an anonymous media impression in that it is not associated with any user demographics.

If the opt-out detector 218 determines at block 316 that the user has not elected to opt out of third-party tracking, the AME impression collection server 214 sends one or more of the third-party device/user identifier(s) 228 to one or more corresponding database proprietor(s) 220*a-b* (block 318). For example, the AME impression collection server 214 sends the one or more third-party device/user identifier(s) 228 to the one or more corresponding database proprietor(s) 220*a-b* with a request for user information at reference number 242, as described above in connection with FIG. 2. The AME impression collection server 214 then receives user information 222a-b from the one or more database proprietor(s) 220a-b (block 320). For example, the AME impression collection server 214 receives the user information 222a-b corresponding to the one or more third-party device/user identifier(s) 228, as described above in connection with reference number 244 of FIG. 2. The AME impression collection server 214 then logs a demographic impression (block 322). For example, the AME impression collection server 214 uses the user information 222a-b to log the demographic impression based on the media impression logged in the AME media impressions database 216 at block 314. The AME impression collection server 214 generates an impression report (block 324). For example, the AME impression collection server 214 generates a user-level or aggregate-level impression report based on the demographic impressions and/or anonymous media impressions logged in the AME media impressions database 216 for media that the Internet media provider 102 has contracted the AME 108 to track or measure. In this manner, the AME 108 can deliver the impression report to the Internet media provider 102. For examples, as shown in the server-to-server communicator process 302, the server-to-server communicator 210 receives the impression report (block 326) from the AME 108. In such examples, the Internet media provider 102 can use such impression reports to make decisions for spending advertising dollars and/or for pricing advertising space available to entities interested in advertising on webpages of the Internet media provider 102 and/or in connection with media served by the Internet media provider 102. Additionally or alternatively, the Internet media provider 102 can use such impression reports to verify that it is displaying media (e.g., advertisements or content) to the demographic groups requested by advertisers or media publishers/producers/creators. In some examples, instead of the server-to-server communicator 210 receiving the impression report 326 from the AME 108, the Internet media provider 102 may receive the impression report from the AME 108 using any other suitable means of communication including, for example, email, file transfer protocol (FTP) transmission, mail, courier, HTTP transmission, etc. The example processes 302, 304 then end.

While example manners of implementing the example server-to-server communicator 210, the example opt-out detector 218, and the example AME impression collection server 214 are illustrated in FIG. 2, one or more of the elements, processes, and/or devices illustrated in FIG. 2 may be combined, divided, rearranged, omitted, eliminated, and/or implemented in any other way. Further, the example server-to-server communicator 210, the example opt-out detector 218, and/or the example AME impression collection server 214 of FIG. 2 may be implemented by hardware, software, firmware and/or any combination of hardware, software and/or firmware. Thus, for example, either of the example server-to-server communicator 210, the example opt-out detector 218, and/or the AME example impression collection server 214 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example server-to-server communicator 210, the example opt-out detector 218, and/or the example AME impression collection server 214, is/are hereby expressly defined to include a tangible computer-readable storage device or storage disk, such as a memory storage device, a digital versatile disk (DVD), a compact disk (CD), a Blu-ray disk, etc. storing the software and/or firmware. Further still, the example server-to-server communicator 210, the example opt-out detector 218, and/or the example AME impression collection server 214 of FIG. 2 may include one or more elements, processes, and/or devices in addition to, or instead of, those illustrated/described in connection with FIG. 2, and/or may include more than one of any or all of the illustrated/described elements, processes, and devices.

The flow diagrams of FIG. 3 are representative of example machine-readable instructions for implementing the example server-to-server communicator 210, the example opt-out detector 218, and the example AME impression collection server 214 of FIG. 2. In these examples, the machine-readable instructions implement programs for execution by processors such as the processor 412, shown in the example processor platform 400 discussed below in connection with FIG. 4, and/or the processor 512, shown in the example processor platform 500 discussed below in connection with FIG. 5. The programs may be embodied in software stored on a tangible computer-readable storage medium, such as a CD-ROM, a floppy disk, a hard drive, a digital versatile disk (DVD), a Blu-ray disk, or a memory associated with the processor 412 and/or the processor 512, but the entire program and/or parts thereof could alternatively be executed by a device other than the processors 412, 512 and/or embodied in firmware or dedicated hardware. Further, although the example programs are described with reference to the flow diagrams illustrated in FIG. 3, many other methods of implementing the example server-to-server communicator 210, the example opt-out detector 218, and/or the example AME impression collection server 214 may alternatively be used. For example, the order of execution of the blocks may be changed, and/or some of the blocks described may be changed, eliminated, or combined.

As mentioned above, the example processes of FIG. 3 may be implemented using coded instructions (e.g., computer- and/or machine-readable instructions) stored on a tangible computer-readable storage medium, such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer-readable storage medium is expressly defined to include any type of computer-readable storage device and/or storage disk and to exclude propagating signals and to exclude transmission media. As used herein, "tangible computer-readable storage medium" and "tangible, machine-readable storage medium" are used interchangeably. Additionally or alternatively, the example processes of FIG. 3 may be implemented using coded instructions (e.g., computer- and/or machine-readable instructions) stored on a nontransitory computer- and/or machine-readable medium, such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term nontransitory computer-readable medium is expressly defined to include any type of computer-readable storage device and/or storage disk and to exclude propagating signals and to exclude transmission media. As used herein, when the phrase "at least" is used as the transition term in a preamble of a claim, it is open-ended in the same manner as the term "comprising" is open-ended.

Figure 4:
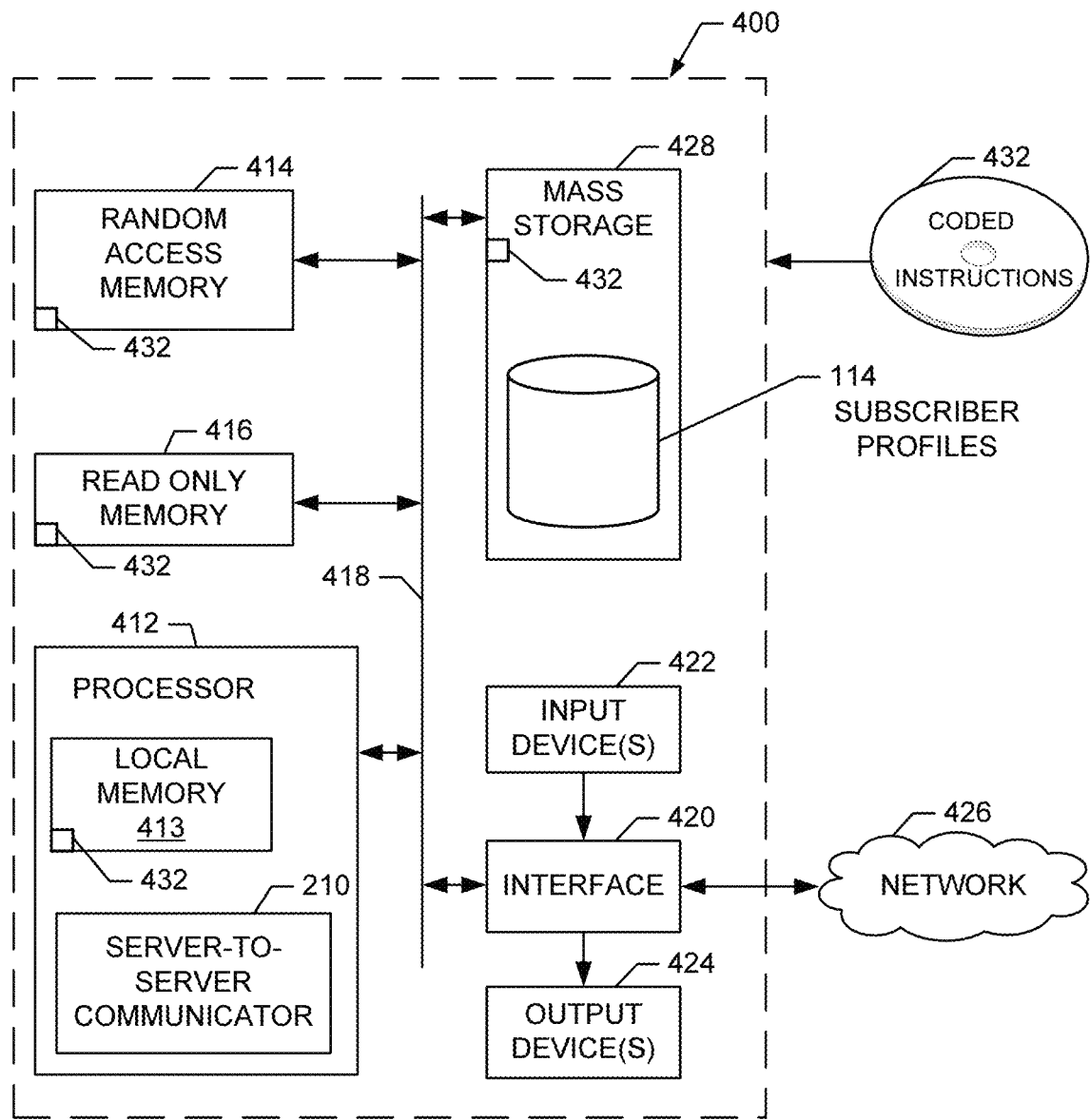
FIG. 4 is an example processor system that may be used to execute example machine-readable instructions of FIG. 3 to implement an example server-to-server communicator of FIG. 2 in accordance with the teachings of this disclosure.

FIG. 4 is a block diagram of an example processor platform 400 capable of executing the machine-readable instructions of the server-to-server communicator process 302 of FIG. 3 to implement the example server-to-server communicator 210 of FIG. 2. The processor platform 400 can be, for example, a server, a personal computer, or any other type of computing device. The example processor platform 400 may be used to implement the main website server 112 of FIGS. 1 and 2 and/or the app server 206 of FIG. 2. In some examples, the main website server 112 and the app server 206 may be implemented separately. In such examples, each of the main website server 112 and the app server 206 may be implemented based on the processor platform 400 as described below. In other examples, the main website server 112 and the app server 206 may be implemented as one server based on the processor platform 400 as described below. In yet other examples, the example processor platform 400 may be used to implement a separate processor system of the Internet media provider 102 that includes the subscriber profiles database 114 of FIGS. 1 and 2 and/or the server-to-server communicator 210 of FIG. 2. In such other examples, the separate processor system implemented by the processor platform 400 does not include the main website server 112 or the app server 206, but it is in communication with the main website server 112 and/or the app server 206 to access the third-party device/user identifier(s) 228 and/or the subscriber ID 118.

The processor platform 400 of the illustrated example includes a processor 412. The processor 412 of the illustrated example is hardware. For example, the processor 412 can be implemented by one or more integrated circuits, logic circuits, microprocessors, or controllers from any desired family or manufacturer. In the illustrated example, the processor 412 implements the server-to-server communicator 210.

The processor 412 of the illustrated example includes a local memory 413 (e.g., a cache). The processor 412 of the illustrated example is in communication with a main memory, including a volatile memory 414 and a nonvolatile memory 416, via a bus 418. The volatile memory 414 may be implemented by synchronous dynamic random access memory (SDRAM), dynamic random access memory (DRAM), RAMBUS Dynamic Random Access Memory (RDRAM), and/or any other type of random-access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a trackpad, a trackball, isopoint, and/or a voice recognition system.

One or more output devices 424 are also connected to the interface circuit 420 of the illustrated example. The output devices 424 can be implemented, for example, by display devices (e.g., a light-emitting diode (LED), an organic light-emitting diode (OLED), a liquid crystal display, a cathode ray tube display (CRT), a touchscreen, a tactile output device, a printer, and/or speakers). The interface circuit 420 of the illustrated example, thus, typically includes a graphics driver card, a graphics driver chip, or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.). The interface circuit 420 of the illustrated example may be configured to communicate with the client device 104 and/or the mobile device 204 to receive the subscriber identifiers 118 and/or the third-party device/user identifier(s) 228 from the mobile device 204 and/or to receive the Internet media provider device/user ID 232 from the client device 104.

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives. In the illustrated example, the mass storage device 428 stores the subscriber profiles database 114 of FIGS. 1 and 2.

Coded instructions 432 to implement the machine-readable instructions represented by the server-to-server communicator process 302 of FIG. 3 may be stored in the mass storage device 428, in the volatile memory 414, in the nonvolatile memory 416, and/or on a removable tangible computer-readable storage medium, such as a CD or DVD.

Figure 5:
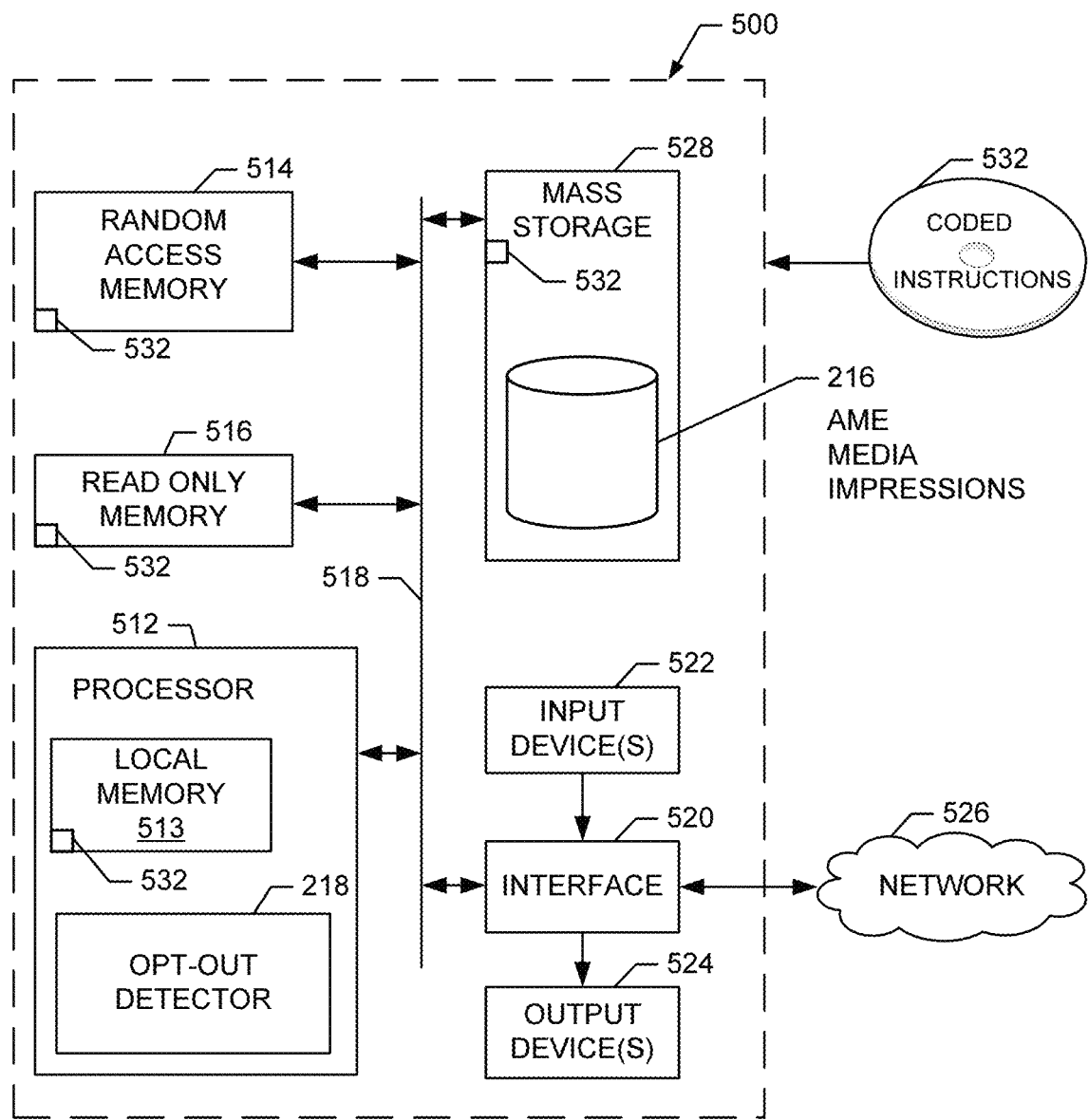
FIG. 5 is an example processor system that may be used to execute example machine-readable instructions of FIG. 3 to implement an example opt-out detector and/or an example AME impression collection server of FIG. 2 in accordance with the teachings of this disclosure.

FIG. 5 is a block diagram of an example processor platform 500 capable of executing the machine-readable instructions of the AME server process 304 of FIG. 3 to implement the example opt-out detector 218 and/or the example AME impression collection server 214 of FIG. 2. The processor platform 500 can be, for example, a server, a personal computer, or any other type of computing device. In some examples, the opt-out detector 218 may be implemented in the AME impression collection server 214. In such examples, the processor platform 500 implements the AME impression collection server 214 and the opt-out detector 218. In other examples, the example processor platform 500 may be used to implement a separate processor system of the AME 108 that includes the opt-out detector 218. In such other examples, the separate processor system implemented by the processor platform 500 does not include the AME impression collection server 214, but it is in communication with the AME impression collection server 214 to access the server-to-server pings or communications obtained from the server-to-server communicator 210 as represented by reference number 238 of FIG. 2.

The processor platform 500 of the illustrated example includes a processor 512. The processor 512 of the illustrated example is hardware. For example, the processor 512 can be implemented by one or more integrated circuits, logic circuits, microprocessors, or controllers from any desired family or manufacturer. In the illustrated example, the processor 512 implements the opt-out detector 218.

The processor 512 of the illustrated example includes a local memory 513 (e.g., a cache). The processor 512 of the illustrated example is in communication with a main memory, including a volatile memory 514 and a nonvolatile memory 516, via a bus 518. The volatile memory 514 may be implemented by synchronous dynamic random access memory (SDRAM), dynamic random access memory (DRAM), RAMBUS Dynamic Random Access Memory (RDRAM), and/or any other type of random-access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a trackpad, a trackball, isopoint, and/or a voice recognition system.

One or more output devices 524 are also connected to the interface circuit 520 of the illustrated example. The output devices 524 can be implemented, for example, by display devices (e.g., a light-emitting diode (LED), an organic light-emitting diode (OLED), a liquid crystal display, a cathode ray tube display (CRT), a touchscreen, a tactile output device, a printer, and/or speakers). The interface circuit 520 of the illustrated example, thus, typically includes a graphics driver card, a graphics driver chip, or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.). The interface circuit 520 of the illustrated example may be configured to communicate with the server-to-server communicator 210 of FIGS. 2 and 4 to receive server-to-server pings or communications as shown by reference number 238 of FIG. 2. In addition, the interface circuit 520 of the illustrated example may be configured to communicate with the database proprietors 220*a-b* to send corresponding ones of the third-party device/user identifier(s) 228 (received via server-to-server pings from the server-to-server communicator 210) to corresponding ones of the database proprietors 220*a-b* and to obtain user information 222*a-b* from the database proprietors 220*a-b*.

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives. In the illustrated example, the mass storage device 528 stores the AME media impressions database 216 of FIG. 2.

Coded instructions 532 to implement the machine-readable instructions represented by the AME server process 304 of FIG. 3 may be stored in the mass storage device 528, in the volatile memory 514, in the nonvolatile memory 516, and/or on a removable tangible computer-readable storage medium, such as a CD or DVD.

From the foregoing, it will be appreciated that the above disclosed methods, apparatus, and articles of manufacture enable Internet media providers to partner and work with audience measurement entities and/or third-party database proprietors to measure Internet activities of non-opt-out users so that impressions can be logged for media accessed via the Internet by those non-opt-out users and so that the demographics corresponding to such non-opt-out users can be obtained without compromising the privacy safeguards elected by the opt-out users. Examples disclosed herein additionally or alternatively enable obtaining such demographics corresponding to non-opt out users without violating corporate policies of Internet media providers and/or database proprietors such as policies against Internet universe resource locator (URL) calls being made outside the domain(s) of the Internet media providers and/or database providers, policies against downloading software not written or provided by the Internet media providers and/or database proprietors. In this manner, the Internet media providers and/or database proprietors can have more control over performance (e.g., website speed), more control over user experience, more control over software configuration management (e.g., to better control software being run on their websites, to substantially reduce or prevent HTTP 404 Not Found error messages, etc.), and limiting risk of malware from being downloaded to users of the Internet media providers and/or database proprietors via third parties.

Disclosed example methods include obtaining a third-party device identifier or user identifier corresponding to a client device; obtaining an opt-out flag indicative of whether a user of the client device has elected not to participate in third-party tracking corresponding to online activities; sending the third-party device identifier or user identifier, the opt-out flag, and a media identifier to an audience measurement entity, the media identifier corresponding to media accessed via the Internet; and receiving, from the audience measurement entity, an impression report corresponding to the media. In some disclosed example methods, the client device is an over-the-top device or a smart television. In some disclosed example methods, the third-party device identifier or user identifier is at least one of an Ad-ID, an Identifier for Advertisers, a Google Advertising ID, or a Roku ID. In some disclosed example methods, receiving the impression report includes receiving demographic information in association with a logged impression corresponding to the media. In some disclosed example methods, the third-party tracking corresponding to the online activities is third-party tracking corresponding to activities at a webpage of an Internet media provider. In some disclosed example methods, the media identifier corresponds to the media accessed via the webpage of the Internet media provider. Some disclosed example methods further include obtaining a subscriber identifier corresponding to a registered user of an Internet media provider. Some disclosed example methods further include determining the third-party device identifier or user identifier based on the subscriber identifier.

Disclosed example apparatus include a processor, a server-to-server communicator, and a communication interface. In such disclosed example apparatus, the processor is to: access a third-party device identifier or user identifier corresponding to a client device; and access an opt-out flag indicative of whether a user of the client device has elected not to participate in third-party tracking corresponding to online activities. In such disclosed example apparatus, the server-to-server communicator is to send the third-party device identifier or user identifier, the opt-out flag, and a media identifier to an audience measurement entity, the media identifier corresponding to media accessed via the Internet. In such disclosed example apparatus, the communication interface is to receive, from the audience measurement entity, an impression report corresponding to the media. In some disclosed example apparatus, the client device is an over-the-top device or a smart television. In some disclosed example apparatus, the third-party device identifier or user identifier is at least one of an Ad-ID, an Identifier for Advertisers, a Google Advertising ID, or a Roku ID. In some disclosed example apparatus, receiving the impression report includes receiving demographic information in association with a logged impression corresponding to the media. In some disclosed example apparatus, the third-party tracking corresponding to the online activities is third-party tracking corresponding to activities at a webpage of an Internet media provider. In some disclosed example apparatus, the media identifier corresponds to the media accessed via the webpage of the Internet media provider. In some disclosed example apparatus, the processor is further to access a subscriber identifier corresponding to a registered user of an Internet media provider. In some disclosed example apparatus, the processor is further to determine the third-party device identifier or user identifier based on the subscriber identifier.

Disclosed example articles of manufacture include machine-readable instructions that, when executed, cause a processor to at least: access a third-party device identifier or user identifier corresponding to a client device; access an opt-out flag indicative of whether a user of the client device has elected not to participate in third-party tracking corresponding to online activities; send the third-party device identifier or user identifier, the opt-out flag, and a media identifier to an audience measurement entity, the media identifier corresponding to media accessed via the Internet; and receive, from the audience measurement entity, an impression report corresponding to the media. In some example articles of manufacture, the client device is an over-the-top device or a smart television. In some example articles of manufacture, the third-party device identifier or user identifier is at least one of an Ad-ID, an Identifier for Advertisers, a Google Advertising ID, or a Roku ID. In some example articles of manufacture, receiving the impression report includes receiving demographic information in association with a logged impression corresponding to the media. In some example articles of manufacture, the third-party tracking corresponding to the online activities is third-party tracking corresponding report to activities at a webpage of an Internet media provider. In some example articles of manufacture, the media identifier corresponds to the media accessed via the webpage of the Internet media provider. In some example articles of manufacture, the instructions are to further cause the processor to access a subscriber identifier corresponding to a registered user of an Internet media provider. In some example articles of manufacture, the instructions are further to cause the processor to determine the third-party device identifier or user identifier based on the subscriber identifier.

Disclosed example methods include logging a media impression for a media identifier representative of media accessed via the Internet; based on a user not having elected to not participate in third-party tracking corresponding to online activities, sending a third-party device identifier or user identifier corresponding to the user to a database proprietor; receiving user information from the database proprietor based on the third-party device identifier or user identifier; logging a demographic impression based on the media impression and the user information; and generating an impression report corresponding to the media based on the demographic impression. Some disclosed example methods further include obtaining an opt-out flag from an Internet media provider from which the media is accessed; and determining that the user has not elected to not participate in third-party tracking based on the opt-out flag. In some disclosed example methods, the media is accessed via the Internet using an over-the-top device or a smart television. In some disclosed example methods, the third-party device identifier or user identifier is at least one of an Ad-ID, an Identifier for Advertisers, a Google Advertising ID, or a Roku ID. In some disclosed example methods, generating the impression report includes associating demographic information with a logged impression corresponding to the media. In some disclosed example methods, the third-party tracking corresponding to the online activities is third-party tracking corresponding to activities at a webpage of an Internet media provider. In some disclosed example methods, the media identifier corresponds to the media accessed via the webpage of the Internet media provider. In some disclosed example methods, the user information includes at least one of demographics, purchase data, or behavior data corresponding to the user.

Disclosed example apparatus include a database, a communication interface, and a processor. In such disclosed example apparatus, the database is to store a logged media impression for a media identifier representative of media accessed via the Internet. In such disclosed example apparatus, the communication interface is to send a third-party device identifier or user identifier corresponding to the user to a database proprietor when a user has not elected to not participate in third-party tracking corresponding to online activities; and receive user information from the database proprietor based on the third-party device identifier or user identifier. In such disclosed example apparatus, the processor is to log a demographic impression based on the media impression and the user information; and generate an impression report corresponding to the media based on the demographic impression. In some disclosed example apparatus, the communication interface is further to obtain an opt-out flag from an Internet media provider from which the media is accessed, and the processor is further to determine that the user has not elected to not participate in third-party tracking based on the opt-out flag. In some disclosed example apparatus, the media is accessed via the Internet using an over-the-top device or a smart television. In some disclosed example apparatus, the third-party device identifier or user identifier is at least one of an Ad-ID, an Identifier for Advertisers, a Google Advertising ID, or a Roku ID. In some disclosed example apparatus, the processor is to generate the impression report by associating demographic information with a logged impression corresponding to the media. In some disclosed example apparatus, the third-party tracking corresponding to the online activities is third-party tracking corresponding to activities at a webpage of an Internet media provider. In some disclosed example apparatus, the media identifier corresponds to the media accessed via the webpage of the Internet media provider. In some disclosed example apparatus, the user information includes at least one of demographics, purchase data, or behavior data corresponding to the user.

Disclosed example articles of manufacture include machine-readable instructions that, when executed, cause a processor to at least: log a media impression for a media identifier representative of media accessed via the Internet; based on a user not having elected to not participate in third-party tracking corresponding to online activities, send a third-party device identifier or user identifier corresponding to the user to a database proprietor; receive user information from the database proprietor based on the third-party device identifier or user identifier; log a demographic impression based on the media impression and the user information; and generate an impression report corresponding to the media based on the demographic impression. In some disclosed articles of manufacture, the instructions are to further cause the processor to: obtain an opt-out flag from an Internet media provider from which the media is accessed; and determine that the user has not elected to not participate in third-party tracking based on the opt-out flag. In some disclosed articles of manufacture, the media is accessed via the Internet using an over-the-top device or a smart television. In some disclosed articles of manufacture, the third-party device identifier or user identifier is at least one of an Ad-ID, an Identifier for Advertisers, a Google Advertising ID, or a Roku ID. In some disclosed articles of manufacture, the instructions are to cause the processor to generate the impression report by associating demographic information with a logged impression corresponding to the media. In some disclosed articles of manufacture, the third-party tracking corresponding to the online activities is third-party tracking corresponding to activities at a webpage of an Internet media provider. In some disclosed articles of manufacture, the media identifier corresponds to the media accessed via the webpage of the Internet media provider. In some disclosed articles of manufacture, the user information includes at least one of demographics, purchase data, or behavior data corresponding to the user.

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   at least one memory;
   instructions in the apparatus; and
   programmable circuitry to be programmed by the instructions to:
   store a logged media impression for a media identifier representative of media accessed via the Internet;
   cause transmission of a device identifier or a user identifier to a database proprietor after determining that an opt-out flag from a first server associated with a provider of the media indicates that a user has not elected to not participate in third-party tracking corresponding to online activities;
   access user information from the database proprietor based on the device identifier or the user identifier;
   log a demographic impression based on the media impression and the user information; and
   generate an impression report corresponding to the media based on the demographic impression.

2. The apparatus of claim 1, wherein the programmable circuitry is to access the opt-out flag received in a server-to-server communication at a second server associated with an audience measurement entity from the first server associated with the provider of the media.

3. The apparatus of claim 1, wherein the media is accessed via the Internet using an over-the-top device or a smart television.

4. The apparatus of claim 1, wherein the device identifier or the user identifier is at least one of an Ad-ID, an Identifier for Advertisers, a GOOGLE Advertising ID, or a ROKU ID.

5. The apparatus of claim 1, wherein the programmable circuitry is to generate the demographic impression by associating demographic information from the user information with the media impression corresponding to the media.

6. The apparatus of claim 1, wherein the third-party tracking is third-party tracking corresponding to activities at a webpage of an Internet media provider.

7. The apparatus of claim 1, wherein the programmable circuitry is to generate the impression report for the media based on a contract of an audience measurement entity to measure the media for the provider of the media, the impression report being a user-level or an aggregate-level impression report.

8. A method, comprising:
   storing, in memory, a logged media impression for a media identifier representative of media accessed via the Internet;
   causing, by executing an instruction with programmable circuitry, transmission of a device identifier or a user identifier to a database proprietor after determining that an opt-out flag from a first server associated with a provider of the media indicates that a user has not elected to not participate in third-party tracking corresponding to online activities;
   accessing, by executing an instruction with the programmable circuitry, user information from the database proprietor based on the device identifier or the user identifier;
   logging, by executing an instruction with the programmable circuitry, a demographic impression based on the media impression and the user information; and
   generating, by executing an instruction with the programmable circuitry, an impression report corresponding to the media based on the demographic impression.

9. The method of claim 8, further including accessing the opt-out flag received in a server-to-server communication at a second server associated with an audience measurement entity from the first server associated with the provider of the media.

10. The method of claim 8, wherein the media is accessed via the Internet using an over-the-top device or a smart television.

11. The method of claim 8, wherein the device identifier or the user identifier is at least one of an Ad-ID, an Identifier for Advertisers, a GOOGLE Advertising ID, or a ROKU ID.

12. The method of claim 8, further including generating the demographic impression by associating demographic information from the user information with the media impression corresponding to the media.

13. The method of claim 8, wherein the third-party tracking is third-party tracking corresponding to activities at a webpage of an Internet media provider.

14. The method of claim 8, further including accessing an opt-out detector to determine whether the user has elected to opt out of participating in third-party tracking.

15. A non-transitory computer readable medium comprising machine-readable instructions to cause a first server to at least:
   store a logged media impression for a media identifier representative of media accessed via the Internet;
   cause transmission of a device identifier or a user identifier to a database proprietor after determining that an opt-out flag from a second server associated with a provider of the media indicates that a user has not elected to not participate in third-party tracking corresponding to online activities;

access user information from the database proprietor based on the device identifier or the user identifier;

log a demographic impression based on the media impression and the user information; and generate an impression report corresponding to the media based on the demographic impression.

16. The non-transitory computer readable medium of claim 15, wherein the first server is associated with an audience measurement entity, the instructions to cause the first server to access the opt-out flag received in a server-to-server communication at the first server from a second server associated with the provider of the media.

17. The non-transitory computer readable medium of claim 15, wherein the media is accessed via the Internet using an over-the-top device or a smart television.

18. The non-transitory computer readable medium of claim 15, wherein the device identifier or the user identifier is at least one of an Ad-ID, an Identifier for Advertisers, a GOOGLE Advertising ID, or a ROKU ID.

19. The non-transitory computer readable medium of claim 15, wherein the instructions are to cause the first server to generate the demographic impression by associating demographic information from the user information with the media impression corresponding to the media.

20. The non-transitory computer readable medium of claim 15, wherein the instructions are to cause the first server to deliver the impression report to the provider of the media via a server-to-server communication.

* * * * *